(12) United States Patent
McClean et al.

(10) Patent No.: US 9,363,011 B2
(45) Date of Patent: Jun. 7, 2016

(54) MONITORING AND CONTROLLING OPTICAL NODES

(71) Applicant: II-VI Incorporated, Saxonburg, PA (US)

(72) Inventors: Ian Peter McClean, Brixham (GB); Peter Wigley, Coming, NY (US)

(73) Assignee: II-VI Incorporated, Saxonburg, PA (US)

( * ) Notice: Subject to any disclaimer, the term of this patent is extended or adjusted under 35 U.S.C. 154(b) by 355 days.

(21) Appl. No.: 13/733,351

(22) Filed: Jan. 3, 2013

(65) Prior Publication Data

US 2013/0170828 A1 Jul. 4, 2013

(30) Foreign Application Priority Data

Jan. 4, 2012 (GB) .................................. 1200078.2

(51) Int. Cl.
*H04B 10/079* (2013.01)
*H04B 10/077* (2013.01)

(52) U.S. Cl.
CPC ........ *H04B 10/0795* (2013.01); *H04B 10/0775* (2013.01)

(58) Field of Classification Search
CPC ..................... H04B 10/0775; H04B 10/0795
USPC ................ 398/25, 26; 359/337.1, 334, 341.5, 359/223.1, 341.3, 665, 666; 356/300, 479, 356/246, 319, 402, 601, 73.1; 424/1.29, 424/9.3, 9.4, 9.6
See application file for complete search history.

(56) References Cited

U.S. PATENT DOCUMENTS 8,121,477 B2* 2/2012 Takita ................ H04Q 11/0005
398/48
2002/0141009 A1* 10/2002 Yu ..................... H04B 10/07953
398/9

(Continued)

FOREIGN PATENT DOCUMENTS

EP    1 691 495 A1    8/2006

OTHER PUBLICATIONS

United Kingdom Intellectual Property Office, Search Report Under Section 17(5) and Examination Opinion for Application No. GB1200078.2, dated Apr. 30, 2012, 6 Pages.

*Primary Examiner* — David Payne
*Assistant Examiner* — Omar S Ismail
(74) *Attorney, Agent, or Firm* — Wendy W. Koba

(57) ABSTRACT

A method and apparatus for monitoring and controlling an optical node 100. The optical node 100 including one or more optical components 120, 121 or 122 connected by optical fiber carrying an optical signal 102. The optical signal 102 including a plurality of optical channels. A set of measurement sequences is determined, each measurement sequence defining a set of optical channels from the plurality of optical channels and a measuring sequence for measuring an optical property of the set of optical channels. A measurement sequence is selected from the set of measurement sequences based on the operating conditions of the optical node 100. The optical properties of the set of optical channels of the selected measurement sequence are measured. The measured optical properties are analyzed to determine whether one or more optical components 120, 121 or 122 are causing the optical node 100 to operate outside the tolerance of a defined set of operating conditions. The operation of the determined optical components 120, 121 or 122 are adjusted to enable the optical node 100 to operate in accordance with the defined set of operating conditions. An optical performance monitor is also provided for use with the method and apparatus.

18 Claims, 10 Drawing Sheets

(56) References Cited

U.S. PATENT DOCUMENTS

| | | | |
|---|---|---|---|
| 2002/0165962 A1* | 11/2002 | Alvarez | G06F 8/65 709/226 |
| 2003/0076493 A1* | 4/2003 | Olsson | G02B 6/29302 356/327 |
| 2003/0161630 A1* | 8/2003 | Jayaram | H04B 10/077 398/9 |
| 2003/0161631 A1 | 8/2003 | Margalit | |
| 2004/0096212 A1 | 5/2004 | McLeod et al. | |
| 2004/0165886 A1 | 8/2004 | Barwicz et al. | |
| 2005/0105902 A1 | 5/2005 | Alavie et al. | |
| 2006/0013585 A1* | 1/2006 | Hnatiw | G01J 3/28 398/38 |
| 2007/0264938 A1* | 11/2007 | Srinivasan | H04W 24/00 455/67.11 |
| 2007/0280687 A1* | 12/2007 | Wan | H04B 10/0775 398/58 |
| 2008/0080865 A1* | 4/2008 | Muro | H04J 14/0204 398/83 |
| 2008/0267631 A1* | 10/2008 | Collings | H04J 14/0205 398/97 |
| 2009/0190204 A1* | 7/2009 | Onaka | H01S 3/06758 359/334 |
| 2010/0142943 A1* | 6/2010 | Frankel | H04B 10/0795 398/25 |
| 2011/0229128 A1* | 9/2011 | Sakamoto | H04B 10/0775 398/29 |
| 2012/0230681 A1* | 9/2012 | Ueki | H04B 10/506 398/34 |

* cited by examiner

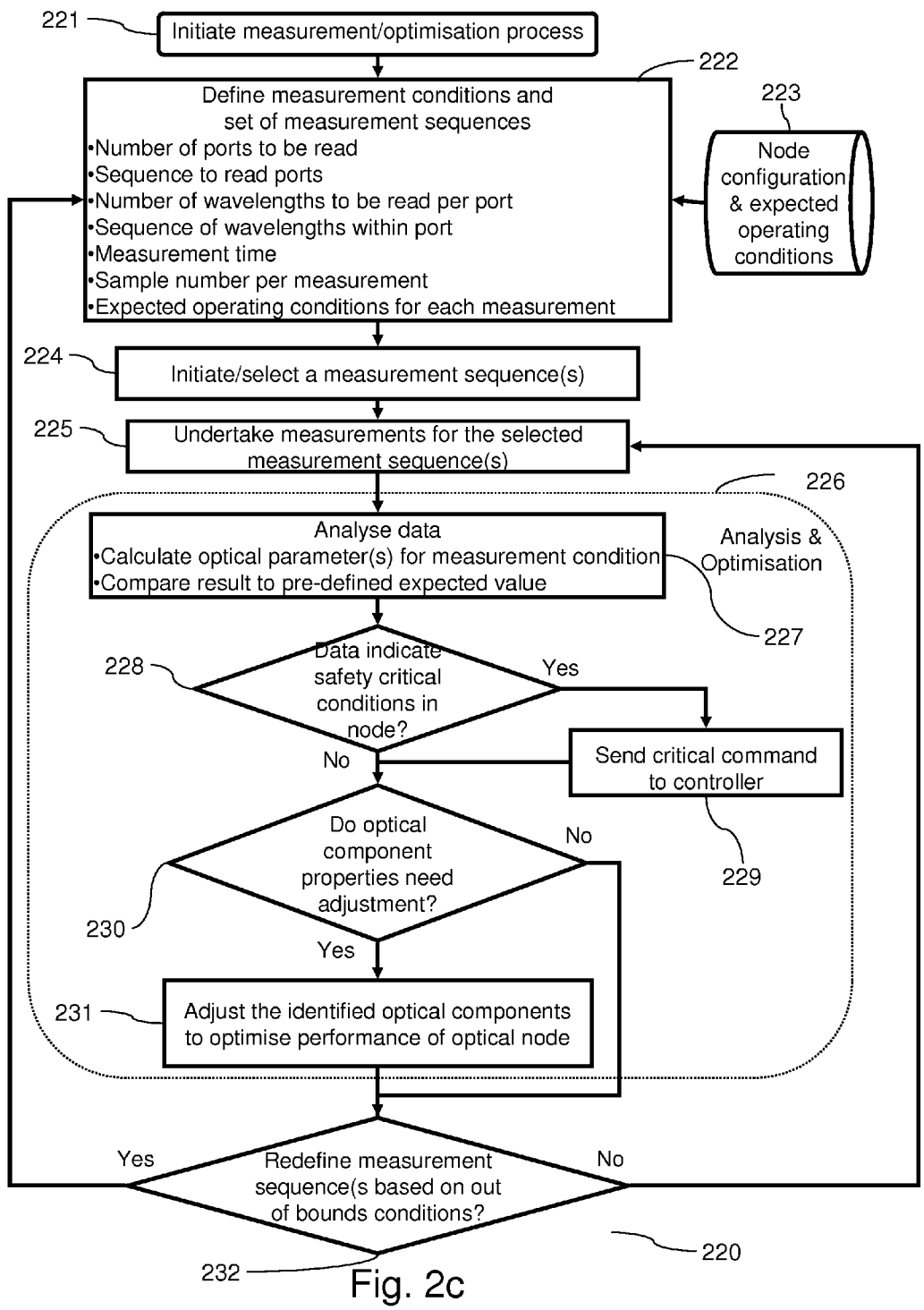

MONITORING AND CONTROLLING OPTICAL NODES

CROSS-REFERENCE TO RELATED APPLICATION

This application claims the benefit of United Kingdom Application GB 1200078.2, filed Jan. 4, 2012, which is incorporated by reference herein in its entirety.

FIELD OF THE INVENTION

The present invention relates to methods and apparatus for monitoring and controlling optical nodes, more particularly to methods and apparatus for monitoring, controlling, and optimising the optical properties (e.g. optical powers) of optical signal channels in optical nodes of an optical network.

BACKGROUND OF THE INVENTION

In this specification the term "light" will be used in the sense that it is used in optical systems to mean not just visible light, but also electromagnetic radiation having a wavelength outside that of the visible range. Also the term "channel" shall be used which refers to a discrete wavelength of light in which a distinct set of data is transmitted.

Optical Performance Monitors (OPMs) are used within optical networks for monitoring the optical properties of optical signal channels such as channel powers throughout an optical node or optical system. Their output can be used in controlling the signal powers of optical signal channels in a node. They are particularly useful in Raman amplifiers where it is difficult to control the gain in the fibre since it is an integral part of the optical transmission system, so power control at the Raman laser power injection point in the span for co-propagating pumping is often carried out. OPMs can be used to monitor a single channel, dual channel or multiple channels.

Conventional OPMs are typically made of fused couplers that tap a fixed proportion of light into another fibre and to a photodiode, typically a PIN diode. The PIN diode is used in determining the total light power which could be made up of light from a single channel or multiple channels including noise. This provides useful information, but does not give any granular detail about the signal(s) and noise at the monitor point. In dense wavelength division multiplexed (DWDM) transmission, channels are represented by wavelengths of the optical light. To measure each discrete wavelength of light a filter must be used in front of the PIN diode. Measuring different channels or different groups of channels may be implemented by changing the filter's response to the incident light so that the centre wavelength or bandwidth of the filter is changed. An example filter could be an interference filter made from a stack of optical thin films or an etalon and by changing the temperature of the component the transmission can be modified to allow a selection of specific wavelengths. However, varying temperature to repeatedly measure each channel across a set of DWDM signals is slow and measurement must be carried out in a sequential order. The temperature changes are not instantaneous so the OPM "sweeps" through numerous wavelengths sequentially before the required channel is reached for measurement. In optics, this is a relatively slow and laborious process.

OPMs that read the optical power from a single channel or from multiple channels at an optical amplifier node can also be used to measure optical power at several different positions within the node. This is achieved with a single OPM having multiple input ports, e.g. one for each physical position. Such OPMs conventionally measure a fixed number of channels, in a fixed order, and in a fixed time-frame, which do not change according to the operating conditions of an optical network.

As networks become less point-to-point and more mesh-like, the routes optical channels take to get through a network are less deterministic. Therefore, there is a significant need to flexibly measure and control the individual channels at any point in an optical node or network. This is useful both in a stable condition as well as conditions where the speed of changing the signal wavelength configuration is key to optimising usage of channels passing in nodes or through the network while minimising disruptions caused by this adding/dropping of channels. There is a need within a network having many optical nodes for improving the control and monitoring of optical nodes to enhance and optimise the performance of the optical network.

SUMMARY OF THE INVENTION

According to one aspect of the present invention, there is provided a method for monitoring and controlling an optical node, the optical node comprising one or more optical components connected by optical fibre carrying an optical signal, the optical signal including a plurality of optical channels. The method comprising determining a set of measurement sequences, each measurement sequence defining a set of optical channels from the plurality of optical channels and a measuring sequence for measuring an optical property of the set of optical channels, selecting a first measurement sequence from the set of measurement sequences based on the operating conditions of the optical node, measuring the optical properties of the set of optical channels of the selected measurement sequence, analysing the measured optical properties for determining whether one or more optical components are causing the optical node to operate outside the tolerance of a defined set of operating conditions, and adjusting the operation of the determined optical components to enable the optical node to operate in accordance with the defined set of operating conditions.

Optionally, the step of determining further comprises determining the set of measurement sequences based on the optical channel conditions within the optical node. As an option, the step of determining further comprises detecting dynamic channel conditions within the optical node, and selecting the first measurement sequence from the set of measurement sequences based on the location of the detected dynamic channel conditions within the optical node. As another option, the step of determining further comprises detecting stable channel conditions within the optical node and selecting the first measurement sequence from the set of measurement sequences based on the detected stable channel conditions.

Optionally, the optical node includes a multiple of optical ports for measuring the plurality of optical channels, and the step of determining the set of measurement sequences is based on at least one of the following parameters in the group of the plurality of optical channels, a number of optical ports within the optical node to be read, a measurement sequence for reading the optical ports, a number of wavelengths to be read per optical port, a measurement sequence of wavelengths within the optical port, a measurement time interval or period, a number of samples per measurement, and a number of expected operating conditions per measurement.

As an option, the step of analysing further comprises the steps of calculating the optical parameters corresponding to the defined set of operating conditions for each optical property measured, and comparing the optical parameters with the corresponding optical property measured. Additionally, the method comprises determining whether the comparison of the optical parameters with the corresponding optical property measured indicates changes in operating conditions of the optical components of the optical node. Alternatively or additionally, the method further comprises identifying a set of optical components by including an optical component of the optical node within the set of optical components when the change in operating conditions for the included optical component is outside the tolerance of the defined operating conditions of the optical component. As an option, the method may include determining whether the comparison of the optical parameters with the corresponding optical property measured indicates a safety critical condition occurring within the optical node, and sending a message to a controller within the optical node of the safety critical condition and indicating at least one optical component for use by the controller in adjusting of the optical component to enable the optical node to operate in accordance with the defined set of operating conditions.

The optical components within the optical node may comprise at least one optical component from the following group of an optical amplifier, an optical performance monitor, a Erbium doped amplifier, a Raman amplifier, a Raman pump module, a wavelength selective switch, an optical routing device, a wavelength blocker, a dispersion compensator, a polarisation mode dispersion compensator, and add and/or drop routing devices. In addition, the method further includes controlling the functionality and performance of at least one optical function from the group of optical components based on the measured set of optical properties.

As an option, the optical node comprises an OPM for use in measuring the optical properties of the set of optical channels, the OPM comprising an optical input for receiving, from one or more locations within the optical node, a portion of the signal light from the set of optical channels. The method further includes selecting a set of desired optical channels from the set of optical channels for measurement, instructing the OPM to perform the steps of measuring an optical property of the selected set of desired optical channels and outputting data representative of the optical properties of the selected set of desired channels for use in the step of analysing. Optionally, the method includes configuring the OPM, based on the set of measurement sequences, to measure the optical properties of the selected optical channels over a desired time-frame, or to decrease the desired time-frame to speed up measuring the desired channels due to channel configuration changes detected within the optical node, or to increase the desired time-frame to slow down measuring the desired channels when the channel configuration of the optical node is substantially stable, and/or to change the order of measuring the one or more desired optical channels.

According to another aspect of the present invention, there is provided an apparatus for controlling and monitoring a node, the apparatus comprising a control unit configured for determining a set of optical channels from the plurality of optical channels and a set of measurement sequences for measuring an optical property of the set of optical channels, a measuring unit configured for measuring the optical properties of the set of optical channels according to each measurement sequence, an analysis unit configured for analysing the measured optical properties of each measurement sequence, a detection unit configured for detecting whether one or more optical components are causing the optical node to operate outside the tolerance of a defined set of operating conditions and identifying a set of optical components causing the optical node to operate outside the tolerance of the defined set of operating conditions, and the control unit is further configured for adjusting the operation of the identified set of optical components to enable the optical node to operate in accordance with the defined set of operating conditions.

Optionally, the control unit is further configured to control and monitor at least one optical component from the following group of an optical node, an optical performance monitor, a optical amplifier, an Erbium doped amplifier, a Raman amplifier, a Raman pump module, a wavelength selective switch, an optical routing device, a wavelength blocker, a dispersion compensator, a polarisation mode dispersion compensator, and an add and/or drop routing device. As an option, the control unit is further configured to control the functionality and performance of at least one optical function from the group of optical components.

Other aspects of the invention provide an optical system comprising an optical node and an apparatus as described for controlling and monitoring the optical node. As an option, the optical node may include an apparatus as described controlling and monitoring the optical node. The optical node may include at least one optical component from the following group of a optical amplifier, an Erbium doped amplifier, a Raman amplifier, a Raman pump module, a wavelength selective switch, an optical routing device, a wavelength blocker, a dispersion compensator, a polarisation mode dispersion compensator, and an add and/or drop routing device. As an option, the control unit is further configured to control the functionality and performance of at least one optical function from the group of optical components.

According a further aspect of the present invention, there is provided an optical performance monitor (OPM) for use with the method and apparatus for monitoring and controlling an optical node, the node comprising an optical fibre carrying an optical signal, the optical signal including a plurality of optical wavelengths of light, the OPM comprising an optical input for receiving at least a proportion of signal light from the optical signal at a measurement point in the optical system, a measuring unit coupled to the optical input, the measuring unit operable to measure an optical property of a selected set of desired optical channels, and a transmitter for outputting data representative of the optical properties of the selected set of desired channels.

Optionally, the measuring unit comprises a signal wavelength selector operable to select the desired optical channel of the signal light for measurement. As an option, the selector is arranged to select any of the channels, without pre-defined order and from any port with predefined order. In addition, the measuring unit is configured to measure one or more desired optical properties, of the selected optical channels or wavelength band on or near the channels.

Other aspects of the invention provide an optical node comprising an apparatus as described and/or a control unit for controlling at least one OPM as described. The measurement data of the optical performance monitor is provided to control the functionality and performance of the at least one optical component of the optical node. The optical node incorporating the OPM may include for a variety of optical functional elements including for example amplification, channel selection, channel routing, wavelength blocking, channel add/drop, dispersion compensation, polarisation mode dispersion as well as any other optical function used within optical transmission nodes. The OPM can be used for monitoring at a single or several points within the optical node to provide a large amount of information for optimising performance of the node as well as for the optical network.

The aspects of the present invention provide the advantage that the measurement points within the optical network or an optical node and number of channels read at each measurement point can be changed on-demand. This results in the speed of channel read being changeable on-demand at any measurement point. For example, in stable operating conditions a full set of DWDM channels at all measurement points can be made. However, in dynamic operating conditions the channels affected at the input port only need to be measured, or one of channels at the input port could be measured. This allows rapid optimisation of the optical nodes including the optical functions within any node and hence the network. Preferably the optical properties measured relate to optical power or optical signal to noise ratio and are used in optimising the performance of any function in node.

As an option or in addition to, the OPM when used in the present invention may receive a portion or all of the channels arriving at its optical input port at any measurement point. In addition, the optical input of the OPM further comprises a plurality of optical input ports for receiving at least a proportion or all of the signal light or channels from a plurality of optical signals at a corresponding plurality of measurement points in the optical node. Optionally, the transmitter interacts via a controller or a control scheme with necessary functional elements within an optical node, for example such as an optical amplifier, routing switch or wavelength blocker and others described in this description although not limited to these elements. The control scheme could for example be implemented via an electronic circuit within the OPM, element or as a separate elements, although not limited to an electronic control method. Preferably, the one or more desired optical properties may comprise optical channel power and/or optical noise.

As an example, when the OPM is used in amplifier nodes incorporating a distributed Raman amplifier and erbium doped fibre amplifiers, the aspects of the present invention enable real-time optimisation of the Raman amplifier during channel reconfiguration/maintenance/transient events. Rapid stabilisation/optimisation of the channel powers in a node due to adding or dropping channels is possible by changing the port order and/or channels to be read to increase the speed of data read in a single or multi-port OPM/OCM.

The invention also provides a computer program configured so that, when run in an apparatus as described, or an optical node or optical system as described, it will cause the apparatus, node or optical system to perform the methods and operations described. The invention provides a computer program product comprising a computer readable medium and a computer program as described, wherein the computer program is stored on the computer readable medium. The invention provides an apparatus, optical node, and/or OPM implemented as an integrated circuit.

BRIEF DESCRIPTION OF THE DRAWINGS

In order that the invention may be more fully understood, some of the embodiments of the invention will now be described, by way of example only, with reference to the accompanying drawings, in which:

FIG. 2c is an illustration of a flow diagram of a further example method for controlling and monitoring according to the invention.

DETAILED DESCRIPTION

Figure 1:
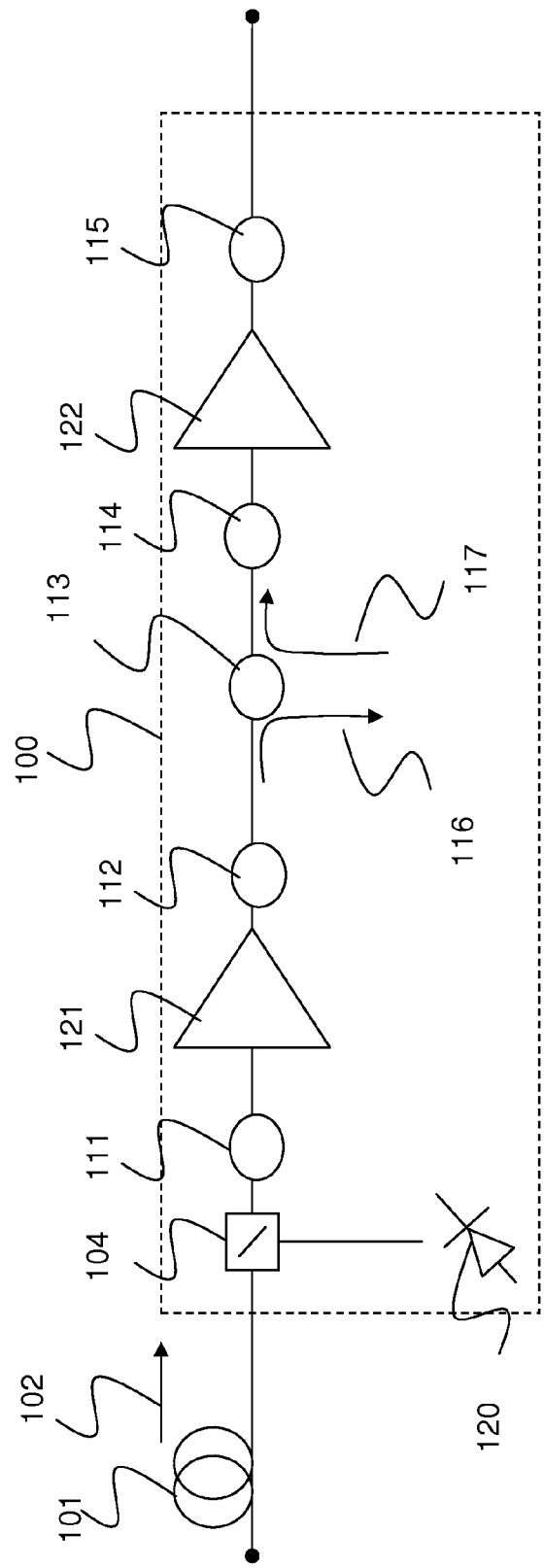
FIG. 1 is a schematic illustration of possible positions within an optical node that can strategically take advantage of embodiments of the present invention.

FIG. 1 is a schematic illustration of an optical node 100 showing several places where optical properties such as optical power or noise can be read for use by a method for monitoring and controlling an optical node 100 according to the invention. The optical node 100 is in a fibre optic communication link having an optical fibre span 101. The fibre optic communication link carries an optical signal 102 including a plurality of optical channels. The optical node 100 includes various optical components for amplifying and controlling the optical power of the optical signal 102, adding/dropping optical channels from the optical signal. Some of the optical components illustrated include Raman pump module 120 and Erbium Doped Fibre amplifiers (EDFA) 121 and 122.

Monitoring points 111 to 115 can be used for reading and measuring optical properties in node 100. Points 116 and 117 can be used for Adding or Dropping channels near or at monitoring points 13 and 14. An OPM or other device for measuring optical properties of the optical channels can be placed to support a flexible fast optimising mesh structure. FIGS. 3 to 7 describe various configurations of possible optical performance monitors (OPMs) that may further assist in the flexible monitoring and control of optical node 100 in an optical system.

As an example, optical channels can be dropped at point 116 and new optical channels added at point 117 within node 100. Amplifiers such as Raman amplifiers using Raman pump module 120 and EDFAs 121 and 122 are required to overcome loss of the span and the add/drop components. There are five monitoring points 111 to 115 illustrated in FIG. 1, where monitoring optical channels is beneficial to maintain correct power levels throughout the node 100.

Typically a conventional single PIN diode with tapped light can be placed at each monitoring point 111 to 115 to measure the sum of all channels and noise incident at the monitoring points 111 to 115 of node 100. This would provide some useful information, but usually not enough for fast and accurate control of amplification in the span and node 100. These diodes are suitable in a static, stable condition. However, if the number of optical channels arriving into the node 100 at monitoring point 111 changes, or are added to (e.g. at point 116) or dropped (e.g. at point 117) from the mid-span at monitoring points 114 or 113 then modification and optimisation of the amplification scheme would be very slow when it is dependent upon at least several optical channel sweeps of all optical channels at monitoring points 111 to 115.

Instead, the method for controlling and monitoring node 100 reads each of the monitoring points 111 to 115 one by one (or in parallel), measuring the optical properties of a desired set of optical channels, to provide a customised channel sweep of each necessary monitoring point for optimising performance of node 100. One or more OPM(s) may be used to read each of the monitoring points 111 to 115. The method includes reading a customised or desired set of channels to provide a finer control of node 100 as each amplifier stage can be optimised for the measured set of optical channels.

For example, when the number of optical channels arriving into the node 100 at point 111 changes, or are added to (e.g. at point 116) or dropped from (e.g. at point 117) to the mid-span at monitoring points 114 or 113, respectively, then modification and optimisation of the amplification scheme in node 100 is achieved using methods and apparatus for flexible monitoring and control of node 100 in conjunction with suitably placed OPMs (some of which are described in FIGS. 3 to 7) to minimise the dynamic changes in channel conditions in node 100. The method and apparatus for monitoring and controlling node 100 may allow any of the measurement points 111 to 115 to be selected to be read continually either with all optical channels or with a reduced number of desired channels, or a selected number of channels, from any two or more measurement points depending on the operating conditions of the optical node 100 and its optical components.

Due to changes in the optical channel conditions, e.g. Adding/Dropping optical channels, the method for monitoring and controlling node 100 is arranged to read and measure optical properties of a desired set of channels allowing the node 100 to react to the measured data to optimise its performance and/or the optical system. For example, in a Raman amplified span when measurements indicate a reduction in total power received at node 100, the method may direct node 100 to perform a measurement sequence to quickly sweep across the required optical channels at low resolution record levels to quickly determine which channels still exist and, based on this information, to set the correct amplification scheme to the span. The measurement sequence defines a set of desired optical channels to be measured and also how the optical channels are to be measured e.g. the order, ports, timeframe for measuring, resolution, etc. Another measurement sequence may be defined and performed to read two or several received optical channels at a higher accuracy for use in refining the Raman gain to give high precision accuracy. This could be achieved by slowing down the read speed of the desired optical channels. Greater local control of amplifiers within the node 100 can improve operational performance by changing how often and what optical channels the process monitors and controls the optical components within the node 100.

In another example, a change in the number of channels of optical signal 102 at monitoring point 114 occurs when the number of Add channels at point 117 is changed. Initially, in static, stable operation of node 100 the method may direct node 100 to perform a measurement sequence based on all measurement points 111 to 115, which are measured in turn with all channels being measured. However, a new channel may be required to be added at point 117, once this is detected, the method or a system controller (not shown) may perform a first measurement sequence that directs the node 100 to read measurement points 114 and 115 only. The measurement sequence may initially concentrate on the position of the new channel at 114 until, for example, its optical power reaches a threshold value where its addition will impact performance of EDFA 122. At this stage, a second measurement sequence may be performed that directs the node 100 or system controller to measure measurement point 115 more thoroughly to ensure controlled addition of the new optical channel at point 117. The node 100 or system controller may read the new channel at point 114 only, and include all channels or a subset of channels at measurement point 115 until the added channel has reached its operational power and the output of EDFA 122 is stable.

It is noted that although the node or a system controller concentrates on the latter monitoring points 114 and 115, the monitor points 111 to 113 may still be measured periodically to ensure that no changes to the input channels occur from signal 102 during the Add event. These further required measurements at points 111 to 113 may be included in the first and second measurement sequences, but with measuring the desired optical channels at points 114 and 115 having a higher priority for being measured during the Add event.

At a subsequent amplifier node (not shown), this subsequent node would detect the changes in signal 102 due to the Add event in node 100. In this subsequent node, the node would then begin to measure the locations corresponding to points 111 and 112 more thoroughly until the added channel is stable within the subsequent node.

The method for monitoring and controlling the node 100 provides the advantages that the measurement points and number of channels read at each measurement point within the node 100 can be changed on-demand. This results in efficient control of node 100 and/of other nodes in the optical system during dynamic operating conditions within node 100 and thus ensures rapid optimisation and stabilisation of the node 100, other nodes, and hence the optical network/system.

Figure 2A:
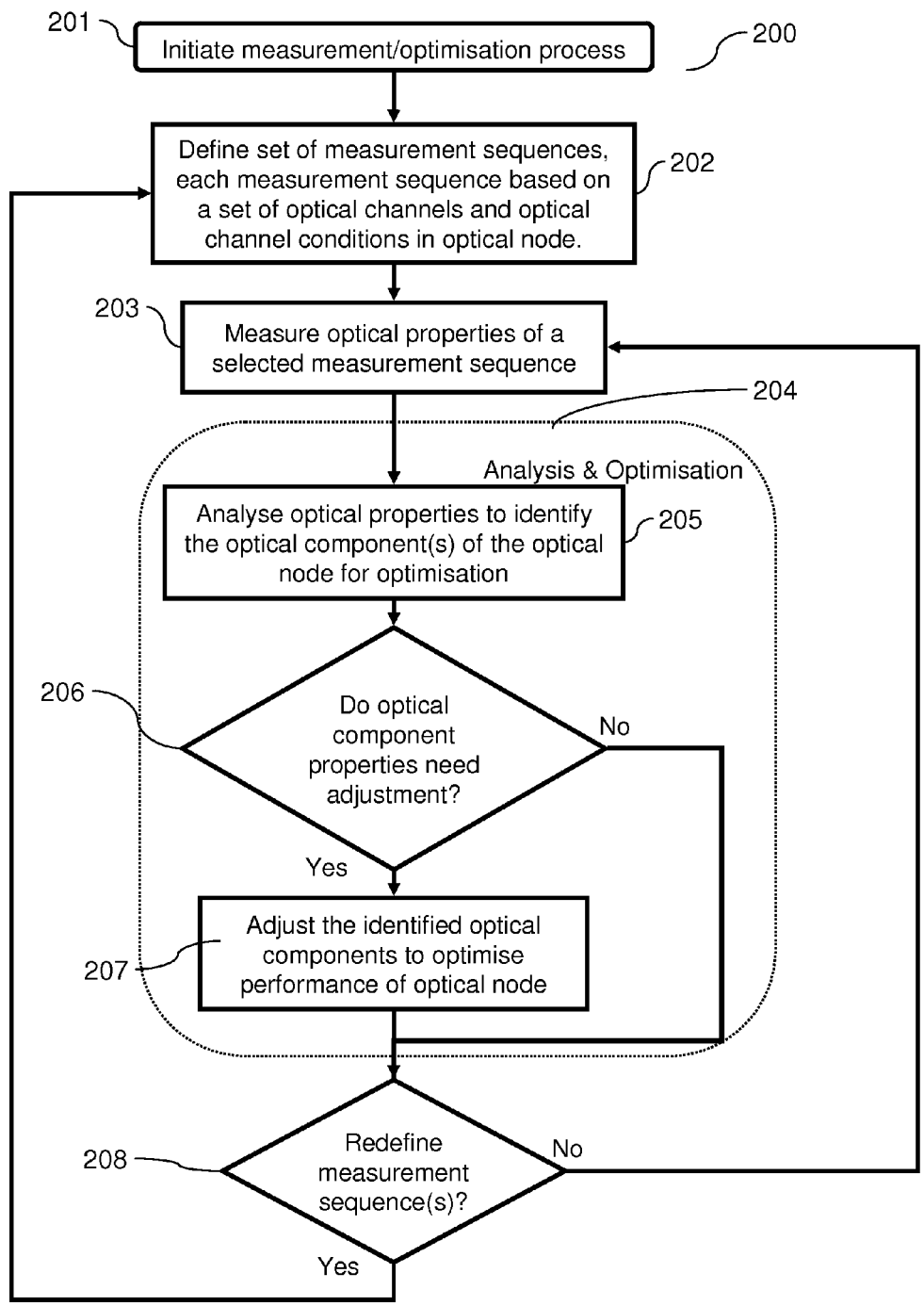
FIG. 2a is an illustration of a flow diagram of an example method for controlling and monitoring according to the invention.
Figure 2B:
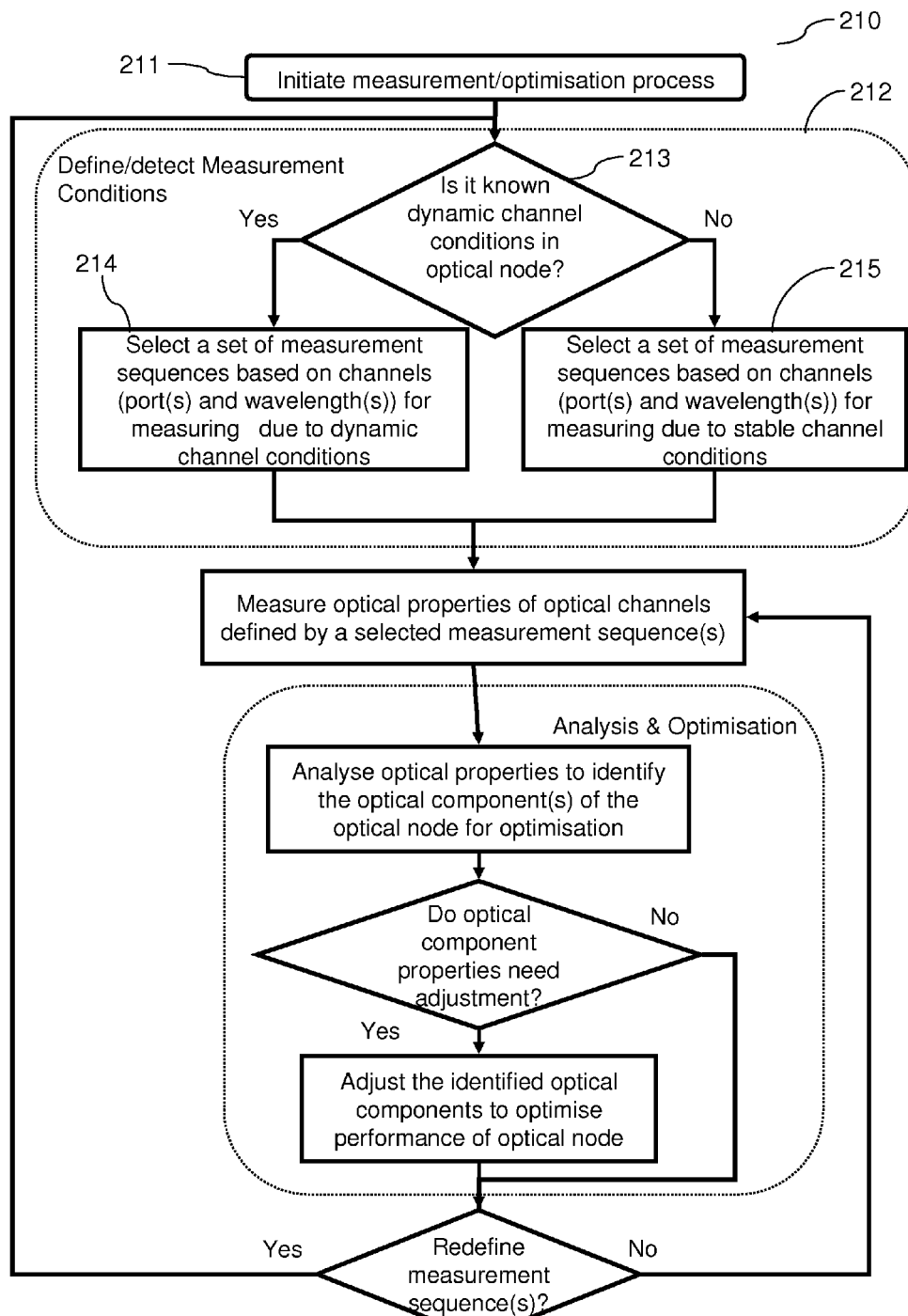
FIG. 2b is an illustration of a flow diagram of another example method for controlling and monitoring according to the invention.

FIGS. 2a to 2c are flow diagrams illustrating methods for use in controlling and optimising the performance of an optical node in the optical system. For simplicity, the same reference numerals used in FIG. 1 will be reused in the following description when identifying the same or similar optical nodes or optical components.

Referring to FIG. 2a, the flow diagram illustrates an example method 200 for use in controlling and/or monitoring an optical node 100 and/or optical system (not shown). In step 201, the method is initialised and arranged to initiate measurement and optimisation of the optical node 100 or optical system. The method for monitoring and controlling the optical node 100 assumes the optical node 100 includes one or more optical components connected by optical fibre carrying an optical signal 102. The optical signal 102 includes a plurality of optical channels, which should be monitored and measured within the optical node 100 to ensure the optical node 100 and/or the optical components are operating within tolerable bounds or defined operating conditions. The method may include monitoring the optical channels at various locations or monitoring points within optical node 100.

In step 202, a set of one or more measurement sequences is determined (or defined), each measurement sequence includes one or more defined parameters that are based on the operating conditions or expected operating conditions of the optical node 100. A measurement sequence may include a set of optical channels selected from the plurality of optical channels for measuring the optical properties and a sequence defining how the optical properties of the set of optical channels are to be measured (e.g. the order, resolution, number of times each optical channel in the set of optical channels may be measured). The optical properties measured may comprise at least one optical property from the group comprising optical channel power, optical signal to noise ratio (OSNR), total signal power, optical noise, pump power, and/or backscatter power.

A set of optical channels may include all of the optical channels in the node 100, or a subset of optical channels in the node 100, or a desired set of optical channels in the node 100. The set of optical channels may be defined based on a determination on which optical channels should be monitored and/or measured and the order the optical channels should be measured. This may depend on whether dynamic channel conditions are detected or are occurring, or whether stable channel conditions are detected or are occurring within the node 100. The measurement sequence may be based on the specifics of the optical node configuration and expected operating conditions.

As an example, a measurement sequence may define, based on a selected set of optical channels, the number of optical ports in the optical node to be read, the sequence of reading the ports, the number of wavelengths from the set of optical channels to be read per port, the measurement time per port, or the measurement time for the measurement sequence to complete, the number of samples per measurement, and the expected operating conditions in relation to each measurement. A set of measurement sequences may be defined for each type of dynamic channel condition than may eventuate during operation of the optical node 100. From the set of measurement sequences, a suitable measurement sequence may be selected for use in controlling and monitoring the optical node 100 depending on the current channel conditions detected in optical node 100.

The optical node 100 may includes a multiple of optical ports for measuring the plurality of optical channels, and determining a measurement sequence (and set of optical channels) may be based on at least one of the following parameters in the group of a number of optical ports or monitoring points within the optical node 100 to be read, a measuring sequence or order for reading the optical ports, a number of wavelengths to be read per optical port or monitoring point, a measurement sequence of wavelengths within the optical port or monitoring point, a measurement time interval or period, number of cycles of the measurement sequence, a number of samples per measurement, and/or a number of expected operating conditions per measurement.

In step 203, a measurement sequence or set of measurement sequences is selected and the selected measurement sequence(s) is used in measuring the optical properties of the defined set of optical channels. The selection of a measurement sequence may depend on the location of detected changes in optical channel conditions in the optical node e.g. an Add or Drop event may have occurred or an optical component is not operating according to defined operating conditions in the optical node. Once measurement data becomes available during a selected measurement sequence, it may be analysed in step 204 while further measurements of the measurement sequence are being performed. This will allow a rapid response to changing operating conditions within the optical node and/or optical components.

In step 204, analysis and optimisation of the optical node 100 and/or its optical components is performed based on the data representing the measured optical properties from the measurement sequence. In step 205, analysis of the measured optical properties is performed for the optical node and/or optical components to determine whether one or more optical components are causing the optical node to operate outside the tolerance of the defined set of operating conditions of the optical node. The analysis may include calculating the optical parameters corresponding to the defined set of operating conditions for each optical property measured, and comparing the optical parameters with the corresponding optical property measured. This can be used to identify the optical components causing the optical node 100 to operate sub-optimally. The one or more optical components identified may require adjustment/optimisation to stabilise the operating conditions of node 100. The measured optical properties may be compared with expected optical properties of the optical node and/or optical components. In addition, specific operating conditions based on the measured optical properties may be calculated and compared with expected operating conditions. A set of optical components that are causing the optical node 100 to operate outside the tolerance of the defined set of operating conditions may be identified.

In detecting and identifying the optical components, it may be determined from the measurement sequence data that a safety critical condition in relation to the optical components or node has occurred. This may happen when a comparison of the measurement data with corresponding expected values of the measurement data shows the optical node 100 or some of its optical components are operating sub-optimally. Detecting and identifying the optical components may further comprise determining whether the comparison of calculated optical parameters with the corresponding optical property measured indicates the safety critical condition occurring within the optical node 100. This will need to be arrested by adjusting either directly or indirectly the operating parameters/properties of the node 100 and/or the affected optical components.

In step 206, based on the analysis in step 205, it is determined whether any optical components have been identified that requires adjustment and/or further optimisation. A decision is made as whether to change the operation of any optical components. If no changes or adjustments to the optical components are required (e.g. a "No") the analysis and optimisation phase step 204 is complete and the method proceeds to step 208 bypassing step 207. However, if a set of identified optical components require adjustment and/or optimisation, (e.g. "Yes"), then the sequence moves onto step 207.

In step 207, the operation of the optical components from the set of identified optical components are adjusted either directly or indirectly to enable the optical node 100 to operate in accordance with the defined set of operating conditions, i.e. to change the operation of node 100 rapidly from dynamic operating conditions to stable operating conditions. The adjustment may be performed indirectly by sending a flag or an indication to a node controller or a system controller of an identified optical component in node 100 that is operating in a safety critical condition or sub-optimally. Alternatively or additionally, a message or flag may be sent to a controller of the optical node 100 in relation to the safety critical condition for use by the controller in prioritizing the adjustment of the identified set of optical components. On receiving the flag or indication, the controller would be configured to adjust the operating parameters of the node 100 or optical component accordingly. Alternatively or additionally, in step 207 the method may directly adjust the optical node 100 and/or identified optical components such that they are configured to operate within the tolerance of the defined set of operating conditions of the optical node 100.

In step 208, after step 207, whether or not adjustment of any identified optical components occurred, it is determined whether the current measurement sequence can still be used, or another selected from the set of measurement sequences, or whether one or more measurement sequences should be redefined based on adjustments or further dynamic conditions occurring in the optical node 100. If a new measurement sequence needs to be defined (i.e. the decision in step 208 is a Yes), then the process proceeds to step 202. In step 202, the new measurement sequence is defined based upon the measurements, node configuration and optical components, and the defined operating conditions. The process proceeds to step 203 based on another selected measurement sequence depending on the operating conditions of the optical node 100 and/or the channel conditions. However, if the current measurement sequence is suitable for further control and monitoring of the optical node 100 and/or the optical components (e.g. the decision in step 208 is a No) or it is determined that another measurement sequence from the set of measurement sequences is to be selected, then the process proceeds to step 203, where the current measurement sequence is used or another measurement sequence is selected from the set of measurement sequences.

FIG. 2b is another flow diagram illustrating another example method 210 for controlling and/or monitoring optical node 100. In step 211, the process is initialised and arranged to initiate measurement and optimisation of the optical node 100 or optical system. In step 212, a set of measurement sequences may be defined depending on dynamic and/or stable operating channel conditions in node 100. Once defined, a measurement sequence based on the sequence of optical channels (port(s) and wavelength(s) of the channel(s)) to be measured and the operating conditions of node 100 is selected. The measurement sequence defines the set of optical channels from the plurality of optical channels for measuring an optical property (or more than one optical properties) of the set of optical channels.

In step 213, it is determined whether dynamic channel conditions within the optical node 100 have been detected or are occurring. Such conditions may be for example a channel Add/Drop event at a particular location or point within the optical node 100. If dynamic conditions within the optical node 100 have been detected or are occurring, then the method proceeds to step 214, where a set of measurement sequences are selected based on a set of optical channels and the detected dynamic channel conditions within the optical node 100. The set of measurement sequences may include one or more measurement sequences. The set of optical channels may be those channels in the vicinity of the detected dynamic channel conditions. If dynamic channel conditions within the optical node have not been detected or are not occurring, that is if stable channel conditions within the optical node have been detected, then the process proceeds to step 215. In step 215, a set of measurement sequences are selected based on a set of optical channels due to the detected stable channel conditions. Once a set of measurement sequence(s) has been selected, then the method may continue in line with steps 203 to 208 illustrated in FIG. 2a.

FIG. 2c is another flow diagram illustrating an example method 220 for use in controlling and/or monitoring optical node 100. In step 221, the method is initialised and arranged to initiate measurement and optimisation of the optical node 100. After initialization, in step 222, measurement conditions are detected and defined for use in measuring one or more optical properties of a plurality of optical channels, or a subset of optical channels, or sets of optical channels. From these conditions, a set of measurement sequences may be defined, each measurement sequence including a set of optical channels from the plurality of optical channels and a measuring sequence for use in defining how the set of optical channels will be measured. The measurement sequence is based on the specifics of the optical node configuration and expected operating conditions and/or current operating conditions of node 100.

For example, a measurement sequence may define the set of optical channels by the optical channels that are detected to have dynamically changed or those that are stable or are exhibiting stable channel conditions. The measurement sequence may further define the measuring sequence of the set of optical channels by the optical properties to be measured for each optical channel, the number of optical ports in the optical node to be read, the sequence of reading the ports, the number of wavelengths to be read per port, the measurement time per port, or the measurement time for the measurement sequence, the number of samples per measurement, priority of which optical channels should be measured first, and the expected operating conditions in relation to each measurement.

A set of measurement sequences can be defined depending on the configuration of the optical node 100 and/or the current or expected operating conditions of the optical node 100 and its optical components. Therefore, step 222 may define a set of measurement sequences including one or more measurement sequences, each measurement sequence for use in measuring the optical properties of a desired set of optical channels over a desired period of time.

In step 223, when defining the set of measurement sequences based on the measurement conditions, the method may query the node 100, or a local database or storage unit (not shown) within the electronics control function of the node 100 or the optical system and receive data relating to the configuration of the optical node 100 and the expected operating conditions of the optical node 100 and/or the components of the optical node 100. This data is input to step 222 for use in defining the one or more measurement sequences for use by the method 220 for monitoring and controlling optical node 100.

As another example, a defined measurement sequence may at least include a set of optical channels to be measured, the locations of the monitoring points 111 to 115 requiring measurement, setting the number of input ports related to the set of optical channels, the sequence to read the ports (e.g. the read order of the ports and/or optical channels per port), prioritisation of channel read/measured, the wavelengths to be measured, the measurement order of the wavelengths to be measured, the sample number and time for each measurement (to optimise accuracy). The expected measurement bounds for each measurement are set so that these and the measured optical properties of each part/channel can be compared to confirm the node 100 is operating within expected tolerances. Flags or warnings can be defined for taking action on unexpected or out of bounds operating conditions. During set-up and operation the defined measurement sequence will be tailored to ensure the correct measurement and expected operating condition data is collected with the priority and frequency required. The defined measurement sequence can be modified to ensure a dynamic set of data points, relevant for the operating conditions of the node 100, are retrieved for optimal control of the node 100 and/or optical components within node 100.

In steps 224 and 225, once the set of measurement sequences (one or more measurement sequences) have been defined in step 222, one or more measurement sequences can be selected from the set of measurement sequences and measurement of the optical properties is initiated based on the selected measurement sequence(s). A measurement sequence may be chosen depending on the operating conditions of optical node 100 or changes in the optical channel conditions within the node 100. In step 225 measurements are undertaken based on the selected measurement sequence(s) and measurement data is retrieved for use in an analysis and optimisation of node 100.

In step 226, it is important that the measurement data be analysed as quickly as possible. Once measurement data becomes available during a measurement sequence being performed, then this data may be analysed while further measurements based on the measurement sequence are performed. The method does not need to wait until all measurements in a measurement sequence have been completed, or when all of the measurement sequences in a set or subset of measurement sequences have completed. This ensures a rapid response can be made due to changing operating conditions within the node 100 and its optical components. This also allows identification of whether critical conditions within the node or optical components have been reached, which may require an immediate response for those optical components affected. For example, a response may require operations, such as automatic power reduction (APR) on any optical emitting devices in the node (e.g. 980 nm pumps in an EDFA or 14XX pumps in Raman modules). The measured data is analysed and follows the defined measurement sequence that supports the particular operating condition of the node 100. For example, measurements that affect safety would likely be the primary measurements analysed first, and may take place several times in a test, measurement, and analysis of a measurement sequence.

In step 227, the measurement data received from performing the measurement sequence is analysed in which one or more calculations of the required optical parameter(s) or properties are performed in relation to the operating conditions of node 100. These calculations are based on, for example, determining the expected optical power or OSNR of the channel(s) being measured and comparing the expected calculations/parameters with calculations/parameters based on the measured data. This is to determine whether the node 100 and its optical components are operating within the defined operating conditions i.e. within expected tolerances or bounds of the stable operating conditions of node 100. It is to be appreciated that the following example calculations are provided by way of example only, and that this data analysis process is not limited to only these calculations. These calculations may be combined with each other or other calculations for use in determining whether the optical node 100 and/or its optical components are operating within expected operating conditions.

As an example, the calculations may include calculating the expected total optical power from any port and calculating from the measurement data the total measured optical power at any port. The expected and measured calculations are compared to determine if the total power is within the correct bounds (e.g. if the power is too low this could indicate a fibre break in the system span, or a malfunctioning input amplifier). As another example the relative power difference between two optical ports may be calculated and the measured and expected values are compared to determine whether there is an unexpected difference in total powers at measurement points. This may indicate unwanted optical losses such as from a malfunctioning optical component within the node. In another example, the total power of any individual wavelength within any port may be calculated and the measured and expected values are compared to determine if it is within correct operating bounds.

Another example may include calculating the relative difference between the optical power of two or more wavelengths measured within the same port. This could indicate a loss of channels, such as losing a tributary fibre input to the main fibre line or a malfunctioning amplifier control scheme adding unwanted gain tilt. Another example may include calculating the relative difference between the optical power of or between two wavelengths of different ports and the measured and expected values compared. This may indicate, for example, the power of a wavelength before being dropped and of the same wavelength after being added. calculation of the amount of ASE generated by an amplifier by comparison of the total signal power and total power; a measurement of the pump power of amplifiers such as the Raman laser or EDFA laser powers, the measure of backward travelling power, such as backscattered, or back reflected Raman laser powers that can be used to determine if the system is in a safe operating condition.

Once a measurement sequence has been taken and analysed it is possible to continue to the next measurement sequence, or make a decision based upon the measurements taken as shown steps 228 to 230 of FIG. 2c.

In step 228, it is determined whether the received measurement sequence data indicates a safety critical condition has occurred. This may happen when a comparison of the measurement data with corresponding expected/calculated values of the measurement data shows the optical node 100 or some of its optical components are operating sub-optimally or their operating conditions or parameters are out of bounds. If this is the case, then in step 229, a flag or a message is sent to a node controller or a controller of the optical component indicating the critical condition. This will allow the controller to act upon the information such as adjusting the node 100 and/or its optical components to bring the performance of the node 100 to within the expected operating conditions.

After determining whether safety critical conditions have occurred in step 228, and maybe after sending a critical command in step 229, the method then follows steps 206 to 208 as illustrated in FIGS. 2a and 2b. For example, in step 230 another decision is made on the measured data by determining if any optical components and their properties are identified to be in need of adjustment and/or optimisation based upon the measurement data. If so (e.g. "Yes"), then the identified optical components are adjusted in step 231, but if not (e.g. "No") the method proceeds to step 232 to determine whether a new set of measurement sequence(s) is required. In step 232, it is determined whether a new measurement sequence (or set of measurement sequences) should be redefined based on out of bounds conditions, or other conditions that have been determined from the measurements in step 225. For example, as described in FIG. 1, the ports and wavelengths that are measured may be modified based upon measurements indicating changing operating conditions, so another more suitable measurement sequence may be required. If another measurement sequence is required, (e.g. the decision in step 232 is Yes), then the process proceeds back to step 222 to again determine the measurement sequence, otherwise (e.g. the decision in step 232 is No) the process proceeds to step 225 where the proceeding measurement sequence is carried out again. In step 222, a new measurement sequence is defined based upon the measurements, node configuration and optical components, and the defined operating conditions and the method proceeds to steps 224, 225 and 226 based on the new defined measurement sequence(s).

Alternatively or in addition to the above steps, in step 232, the current measurement sequence may be kept and the measurement and analysis steps performed on measurements for the current measurement sequence. However, another measurement sequence may also be selected from the set of measurement sequences that have already been defined depending on, among other things, the channel conditions of node 100, or the current measurement sequence being complete, or another part of the node 100 or set of optical components requiring monitoring and control, or taking the next measurement sequence in a defined sequence of measurement sequences may be undertaken. The method then proceeds to measurement, analysis and decisions in steps 225 to 231 based on the selected measurement sequence.

Once a suitable measurement sequence is selected, then the method proceeds to steps 225 to 232 based on the selected measurement sequence. However, if a new measurement sequence needs to be defined (i.e. the decision in step 232 is a Yes), then an indication is sent to the define measurements conditions step 222 for redefining/defining and updating the set of measurement sequences based on the out of bounds operating conditions of the optical node and/or the related optical components.

It is to be appreciated that FIGS. 2a to 2c describe example methods and that it is possible to modify the steps of these methods and still achieve the required benefits of a flexible monitoring and control of node 100. For example, no decisions may be made and a measurement sequence may be defined once only and continued indefinitely. Alternatively or additionally, a single pass through each measurement sequence in a set of measurement sequences may be undertaken and initiated only when needed or when it is detected that a measurement sequence is required. All measurements in a measurement sequence may be taken before any decisions are made.

Alternatively or additionally, decisions may be taken after any measurement made in a measurement sequence, for example, after each measurement made or after several or a predetermined number of measurements are made in a measurement sequence. Alternatively or additionally, decisions may be taken depending on the priority of a measurement taken in a measurement sequence. For example, a high priority measurement may require a decision to be taken immediately afterwards, whereas a decision may be taken after several or all low priority measurements have been taken. The number or order of decisions can be different, for example, checking safety after every measurement, but assessing the measurement sequence only when a whole measurement sequence is complete. Additional decisions can be added such as within a measurement sequence to decide between two or more alternative measurements based upon the existing data. It is to be appreciated that many other steps in the methods described in FIGS. 2a to 2c and the above options are possible for achieving optimal and flexible monitoring and control of optical node 100.

Figure 2D:
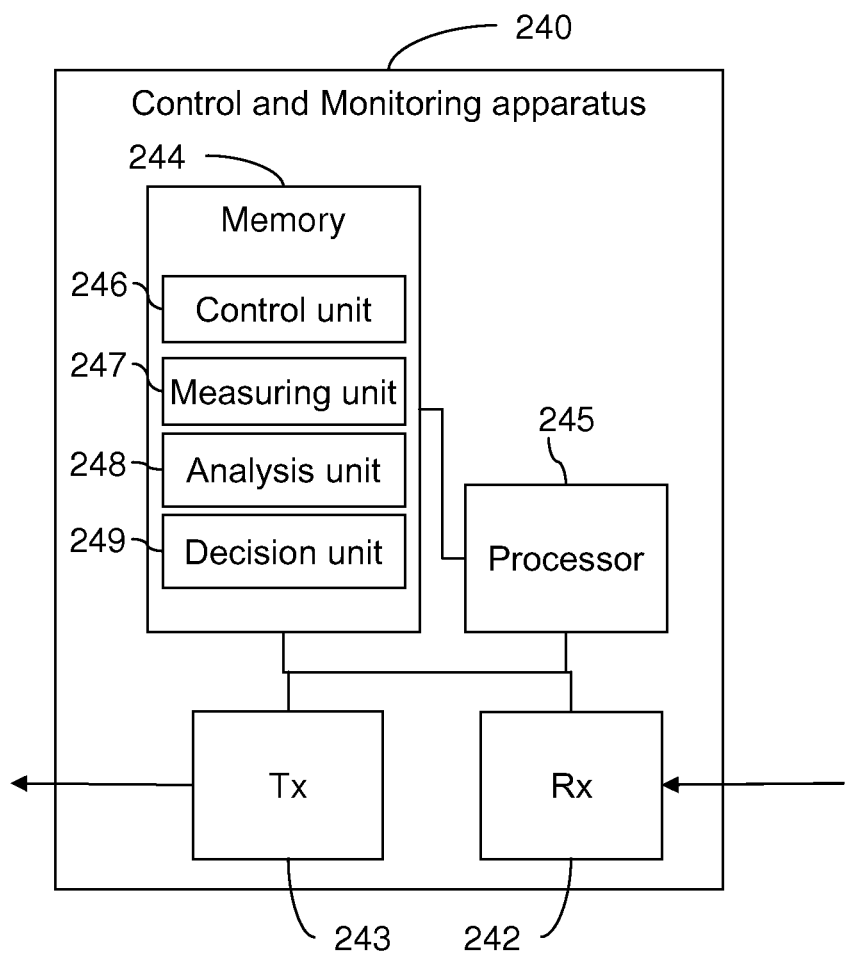
FIG. 2d is a schematic illustration of an example apparatus for controlling and monitoring according to the invention.

FIG. 2d illustrates a schematic of an apparatus 240 for controlling and monitoring optical node 100 or an optical system. The apparatus 240 can be implemented as a combination of hardware and software, and can be configured to operate as a monitor and controller for node 100 in accordance with the methods and solutions described above. The apparatus 240 comprises a receiver 242, a transmitter 243, a memory 244 and a processor 245, which are connected together. The memory 244 stores the various programs/executable files that are implemented by the processor 245 and also provides a storage unit for any required data e.g. sets of measurement sequences, expected operating conditions of the node 100. The programs/executable files stored in the memory 244, and implemented by processor 244, include one or more of, but are not limited to, a control unit 246, a measuring unit 247, an analysis unit 248, and a decision unit 249.

The control unit 246 is configured for determining a set of optical channels from the plurality of optical channels and a set of measurement sequences for measuring an optical property of the set of optical channels. The measuring unit 247 is configured for measuring the optical properties of the set of optical channels according to each measurement sequence. The measuring unit 247 may configure the transmitter 243 to instruct one or more measuring devices (e.g. optical performance monitors) to measure the optical properties of the optical channels according to the measurement sequence. The measuring unit 247 may be further configured to receive, via receiver 242, data representative of the optical properties measurements from the one or more measuring devices or information from the node controller about expected performance parameters and boundary conditions. The analysis unit 248 is configured for analysing the received data representative of the measured optical properties of each measurement sequence, calculating measured optical parameters, comparing these with calculated expected optical parameters in relation to the measurement sequence(s).

The decision unit 249 is configured, based on the comparisons, for determining whether one or more optical components are causing the optical node 100 to operate outside the tolerance of a defined set of operating conditions. The decision unit may also be configured for identifying a set of optical components causing the optical node to operate outside the tolerance of the defined set of operating conditions. The decision unit 249 may be further configured to select another measurement sequence for further measuring a set of channels in optical node 100. The control unit 246 may be further configured for adjusting, either directly or indirectly, the operation of the identified set of optical components to enable the optical node 100 to operate in accordance with the defined set of operating conditions.

The control unit 246 is further configured to control and monitor at least one optical component from the following group including, but not limited to, an optical performance monitor, a optical amplifier, an Erbium doped amplifier 121 and 122, a Raman amplifier 120, a Raman pump module, a wavelength selective switch, an optical routing device, a wavelength blocker, a dispersion compensator, a polarisation mode dispersion compensator, and an add and/or drop routing device. The control unit is further configured to control the functionality and performance of at least one optical function from the group of optical components. The adjustment may be performed directly by adjusting the operating parameters of the optical components. That is, the apparatus 240 transmits via transmitter 243 to the optical components commands for adjusting its operating conditions. Alternatively or additionally, the controller unit may be configured to indirectly adjust the operating parameters of the optical components by sending messages or flags to controllers of optical node 100 and/or its optical components indicating adjustment is necessary and/or further data based on the measurement data for use by the controllers in adjusting the optical components.

The apparatus 240 may be used within an optical system that includes optical node 100 for controlling and monitoring the optical node 100 and/or other optical nodes within the optical system. Alternatively or additionally, optical node 100 may further include the apparatus 240 for controlling and monitoring the optical node 100.

It will be appreciated that to assist the methods 200, 210 and 220, and/or apparatus 240 in measuring and controlling the optical node 100, or other nodes in optical system, that one or more OPMs may be configured to flexibly monitor and measure the set of optical channels according to each defined measurement sequence. As described in FIG. 1, one or more OPMs may be configured to read and measure the optical properties of optical channels from various monitoring points 111 to 115 in a node 100. An OPM may be configured to receive instructions based on the measurement sequence, such that the OPM efficiently measures and sends data representative of the measurements for analysis, monitoring, and control of node 100. In the following, FIGS. 3 to 7 describe various example configurations of an OPM that may be useful in the present invention.

Figure 3:
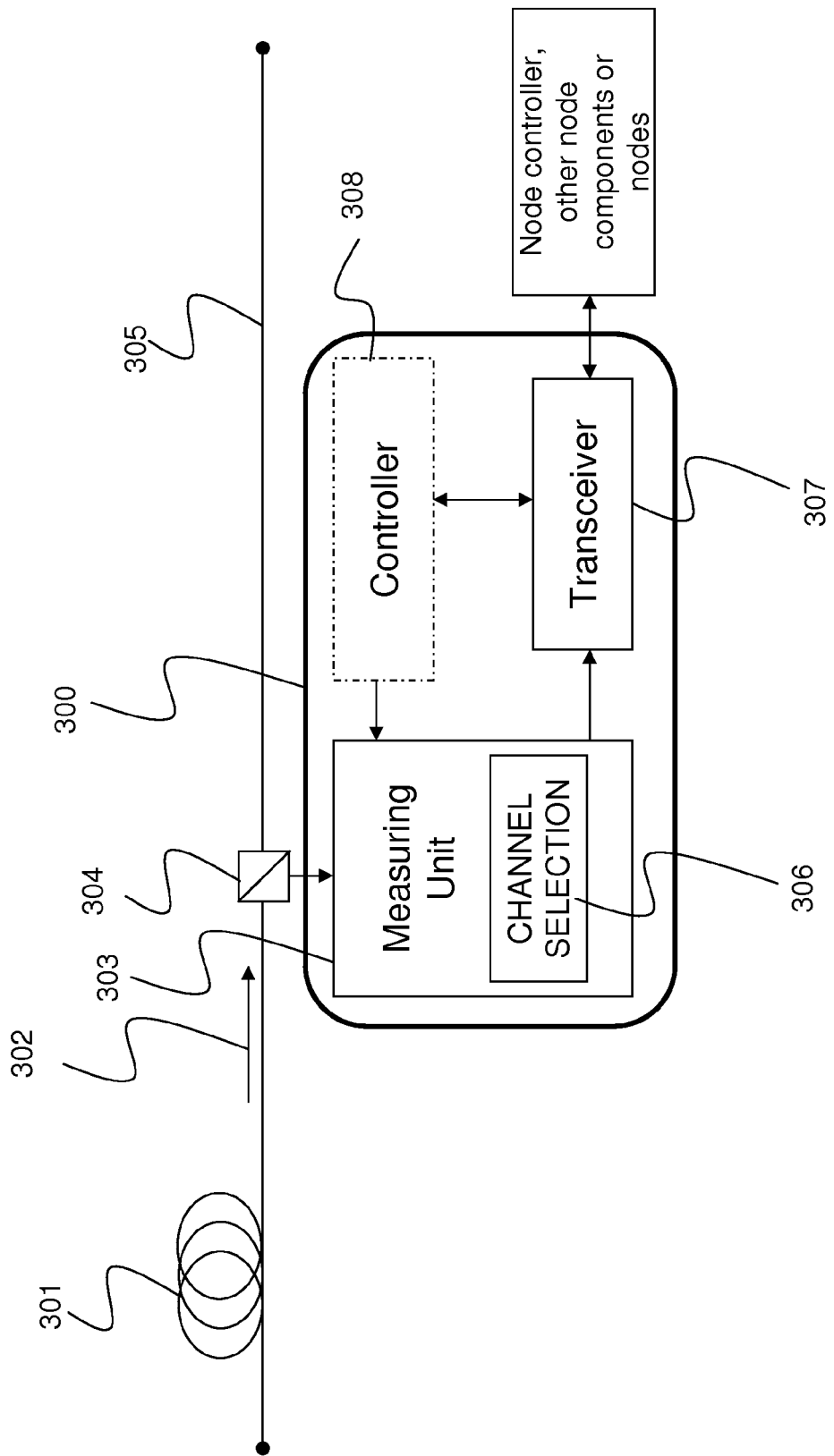
FIG. 3 is a schematic illustration of an OPM for use in the methods and apparatus according to the invention.

FIG. 3 is a schematic illustration of an example OPM 300 for use by the apparatus 240, an optical system, or an optical node 100 in a fibre optic communication link having an optical fibre span 301. The OPM 300 can be used to measure a set of optical channels based on instructions received from the apparatus 240, optical system or node 100 and transmit data representative of the measurements thereto. The fibre optic communication link carries an optical signal 302 including a plurality of optical channels.

The OPM 300 includes a measuring unit 303 coupled to an optical input that receives at least a proportion of the signal light from the optical signal via signal tap 304, which is at the end 305 of the span 301. The measuring unit 303 is arranged to receive the proportion of signal light from the optical input (which may comprise one or more port(s)) and measure the optical properties of one or more channel(s). The measuring unit 303 is arranged to perform channel selection 306 for selecting a set of desired channels (e.g. one or more channel(s)) from which the optical properties have been measured or from which the optical properties will be measured. The measuring unit 303 may be configured to measure one or more desired optical properties, of the selected optical channels or wavelength band on or near the channels. The measuring unit 306 outputs measurement data representative of the optical properties related to the selected set of desired channels to a transceiver 307 for sending to an apparatus 240 for monitoring and controlling the node 100 and/or other nodes (not shown).

Channel selection 306 may be performed prior to measuring in which only the optical properties of a desired set of channels are measured. Alternatively, channel selection 306 may be performed after measuring the optical properties of a plurality of the optical channels in which only the optical property measurements of a set of desired channels are selected for output. Measuring unit 303 may output data representative of the optical properties of a selected set of desired channels.

The measuring unit 303 is optionally coupled to a controller 308 for controlling the operations of channel selecting and measuring. Control of which port(s) and channel(s) to be selected is dependent upon the monitored operating conditions of the node in which OPM 300 may be positioned. Although the controller 308 is shown in FIG. 3 within OPM 300, the controller 308 may preferably be an integral element in the apparatus 240 or node 100 and include programmed response to information received by the transceiver 307 and/or other external inputs such as from other elements in the node 100 or the node master controller. It is also possible to use an external controller such as apparatus 240 or a node controller to manage the measuring unit 303 and the channel selection 306 as long as the timing of the whole system supports the operational requirements.

In operation, in a single measurement port design a proportion of the optical signal 302 is received as signal light by the optical input of OPM 300, in which measuring unit 303 is operable to measure at least a set of selected desired optical channels of the signal light. The measuring unit 303 measures one or more desired optical properties, such as optical power or optical noise which can be used to determine the optical SNR, of the selected optical channels. The measuring unit 303 outputs data representative of the measured optical properties to the transceiver 307 for transmission to other components (such as apparatus 240 or another controller in node 100) of the optical communication link.

The channel selection 306 selects one or more of the desired optical channels on demand and measurement unit 303 is operable to measure the one or more selected desired channels. The channel selection 306 may comprise a signal wavelength selector operable to select the desired optical channel of the signal light for measurement. The selector may be arranged to select any of the channels of the signal light, without pre-defined order and from any port of the optical input with predefined order. As an example, the channel selection 306 may comprise a tuneable filter coupled to an optical measurement device (not shown) for measuring the optical properties of the channel output of the tuneable filter, such an optical measurement device may include a single PIN diode. The tuneable filter can be tuned to any of the signal wavelengths and thus only pass light of a selected channel to the PIN diode for measurement. Further examples of implementations of measuring unit 303 are described with reference to FIGS. 4 to 7.

The measuring unit 303 may take as input an identifier or set of identifiers representing the desired optical channel or a selected set of desired channels, respectively, through a control signal from controller 308. For example, the identifier may define the centre wavelength and bandwidth of the tuneable filter. The filter then moves to the defined state, which selects the channels corresponding to the identifiers. The measuring unit 303 receives parameters or instructions from controller 308 (or apparatus 240, or an external controller (not shown)) to allow it to select the required channels from the set of desired channels in the required order and time-frame for measurement.

The measuring unit 303 is further configurable to measure the optical properties of the selected optical channels over a desired time-frame. In an example embodiment the measuring unit 303 can be configured to decrease the desired time-frame to speed up measuring the desired channels due to channel configuration changes within the optical signal 302. The measuring unit 303 is configured to increase the desired time-frame to slow down measuring the desired channels when the channel configuration of the optical signal 302 is substantially stable via control signals from the controller 308. As briefly described above, measuring device 303 may comprise a tuneable filter coupled with an optical measurement device such as a PIN diode that constantly provides an output signal in relation to the input power of a selected channel. If only one PIN diode is used, then the timeframe that any selected channel is measured by the measuring unit 303 is controlled by the time it takes the tuneable filter to be set to the selected channel. The speed of data transfer is controlled by how fast data is required from the transceiver either by controller 308 or by the external component or node controller. However, the timeframe may be further reduced if a set or array of tuneable filters coupled with a set of optical measurement devices is used in measuring unit 303.

The measuring unit 303 can be configured to measure the one or more optical properties from the group comprising, optical channel power, optical signal to noise ratio (OSNR), total signal power, total optical power, optical noise, pump power, and/or backscatter power. To achieve these functions, the measuring unit 303 can receive commands from the controller 308 to allow configuration changes.

The OPM 300 provides measurements of the optical properties of desired channels to apparatus 240 or other controller that will allow node 100 to react to the measured information to optimise its performance as described with reference to FIGS. 1 to 2d, and/or the optical system rapidly or not as required by the node operation. As an example, the node 100 or apparatus 240 may detect, in a Raman amplified span, a reduction in total power received at the node 100. The controller 308 or network node 100 or apparatus 240 sends a signal representing a measurement sequence to the measuring unit 303, which interprets the signal, and quickly sweeps across all channels at low resolution record levels to allow apparatus 240 or node 100 to quickly determine which channels still exist and based on this information set the correct amplification scheme to the span. The measurement data is transmitted via transceiver 307 to apparatus 240 or node 100 for analysis.

Setting the correct amplification scheme can be achieved by sending another signal (e.g. another measurement sequence) to measuring unit 306 to speed up the read process within the OPM 300. The measurement sequence may indicate that the measuring unit 303 should read two received channels at higher accuracy that are used to refine the Raman gain to give high precision accuracy. This would be achieved by slowing down the read speed of the OPM 300. This is not possible with a single PIN monitor, nor can it be performed quickly using a conventional OPM that has no flexibility in which channel and how often the measurement is made. This example shows how greater local control of nodes, such as amplifier nodes, within an optical system is possible consequently improving operational performance by changing how often and what channels the OPM 100 measures the channel optical powers.

Figure 4:
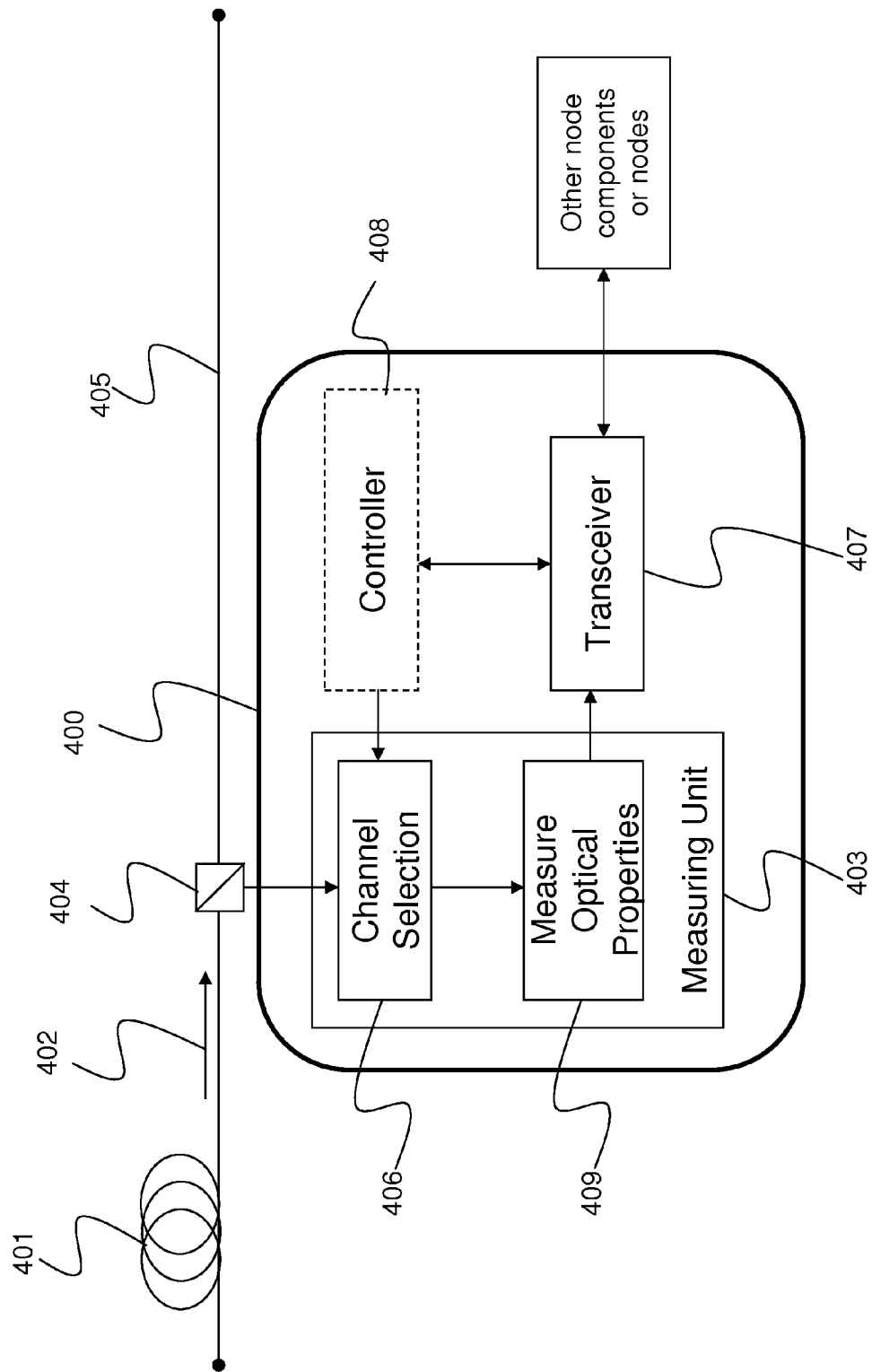
FIG. 4 is a schematic illustration of another OPM for use in the methods and apparatus according to the invention.

FIG. 4 is another schematic illustration of an OPM 400 for use by the apparatus 240, an optical system, or an optical node 100 in a fibre optic communication link having an optical fibre span 401. The fibre optic communication link carries an optical signal 402 including a plurality of optical channels. The OPM 400 includes a measuring unit 403 that comprises a channel selector 406 coupled to an optical input that receives a proportion of the signal light from the optical signal via signal tap 404, which is at the end 405 of the span 401. The channel selector 406 is arranged to receive the proportion of signal light from an optical input (which may comprise one or more port(s)) and select one or more channel(s) for measurement of optical properties. Channel selector 406 provides the selected one or more channel(s) to allow measuring unit 403 to measure the optical properties. The measuring unit 403 comprises an optical measuring device 409 coupled to channel selector 406 for measuring the optical properties of the selected channel(s). Optical measuring device 409 outputs the measurements of the optical properties related to the one or more selected channel(s) to a transceiver 407 for sending to apparatus 240 or other components within a node or other nodes (not shown).

The channel selector 406 and optical measuring device 409 are coupled to a controller 408 (optional) for controlling the operations of channel selecting and measuring. The channel selector 406 may be performed by a single device such as a tuneable filter or even multiple tuneable filters each receiving a portion of the tapped off light or as a combination of optical parts such as a switch to determine the input port and a tuneable filter to select channel(s). Control of which port(s) and channel(s) to be selected is dependent upon the monitored operating conditions of the node. Although the controller 408 is shown in FIG. 4 within OPM 400, the controller may preferably be an integral element in the node and include programmed response to information received by the transceiver 407 and/or other external inputs such as from apparatus 240 or other elements in the node 100 or the node master controller. It is also possible to use an external controller such as apparatus 240 to manage the measuring unit 403, channel selector 406, and optical measuring device 409 as long as the timing of the whole system supports the operational requirements.

In operation, in a single measurement port design a proportion of the optical signal 402 is received as signal light by the optical input of monitor 400, in which channel selector 406 is operable to select one or more desired optical channels of the signal light for measurement. The optical measuring device 409 measures one or more desired optical properties, such as optical power or optical noise which can be used to determine the optical SNR, of the selected optical channels. The optical measuring device 409 outputs data representative of the measured optical properties to the transceiver 407 for transmission to apparatus 240 or other components (such as a controller in node 100) of the optical communication link.

The channel selector 406 is operable to select one or more of the desired optical channels on demand and optical measuring device 409 is operable to measure the one or more selected desired channels. In an example embodiment, the channel selector 406 may be a tuneable filter coupled to the optical measuring device 409, which may include a single PIN diode. The tuneable filter of channel selector 406 can be tuned to any of the signal wavelengths and thus only pass light of the selected channel to the PIN diode for measurement. The tuneable filter could be made from a diffraction grating whose angle relative to the PIN diode is changed to pass different wavelengths of light to the PIN. The tuneable filter can be designed so that it does not need to sequentially move from wavelength to wavelength, but instead can be tuned to any wavelength in any order. This adds an increased granularity to the power measurement not achievable with the conventional TAP-PIN combination. The bandwidth of the tuneable filter can also be expanded so that more than one channel can pass into the PIN diode allowing sub-band measurements to be made. This could be achieved with a diffraction grating by changing the distance between the grating and the PIN diode. Thus the channel selector 406 is configurable to change the number of channels selected.

The channel selector 406 takes as input an identifier or set of identifiers representing the desired optical channel or a set of desired channels, respectively, through a control signal from controller 408 which defines the centre wavelength and bandwidth of the tuneable filter. The filter then moves to the defined state, which selects the channels corresponding to the identifiers. The channel selector 406 can receive such parameters or instructions from measuring unit 403, optical measuring device 409, or controller 408 to allow it to select the required channels in the required order and time-frame for measurement by measuring unit 403.

The measuring unit 403 is further configurable to measure the optical properties of the selected optical channels over a desired time-frame. In an example embodiment the measuring unit 403 can be configured to decrease the desired time-frame to speed up measuring the desired channels due to channel configuration changes within the optical signal 402. The measuring unit 403 is configured to increase the desired time-frame to slow down measuring the desired channels when the channel configuration of the optical signal 402 is substantially stable via control signals from the controller 408. As briefly described above, optical measuring device 409 of measuring unit 403 may comprise a PIN diode that constantly provides an output signal in relation to the input power of the channel(s) selected by the channel selector 406. The timeframe that any selected channel is measured by the optical measuring device 409 is controlled by the time the channel selector 406 is set at any condition and the speed of data transfer is controlled by how fast data is required from the transceiver either by controller 408 or by apparatus 240 or other external component or node controller.

The measuring unit 403 can be configured to measure the one or more optical properties from the group comprising optical channel power, optical signal to noise ratio (OSNR), total signal power, total optical power, optical noise, pump power, and/or backscatter power. To achieve these functions, the channel selector 406 and/or optical measuring device 409 can receive commands from the measuring unit 403, controller 408, apparatus 240 or other controlling entity to allow configuration changes. Measuring unit 403 would also contain electronics and maybe data processing circuits to convert optical measuring device 409 data, such as PIN diode data, into the optical properties information.

The OPM 400 provides measurements of the optical properties of desired channels to apparatus 240 or other component in node 100 allowing node 100 to react to the measured information to optimise its performance and/or the optical system rapidly or not as required by the node operation.

Figure 5:
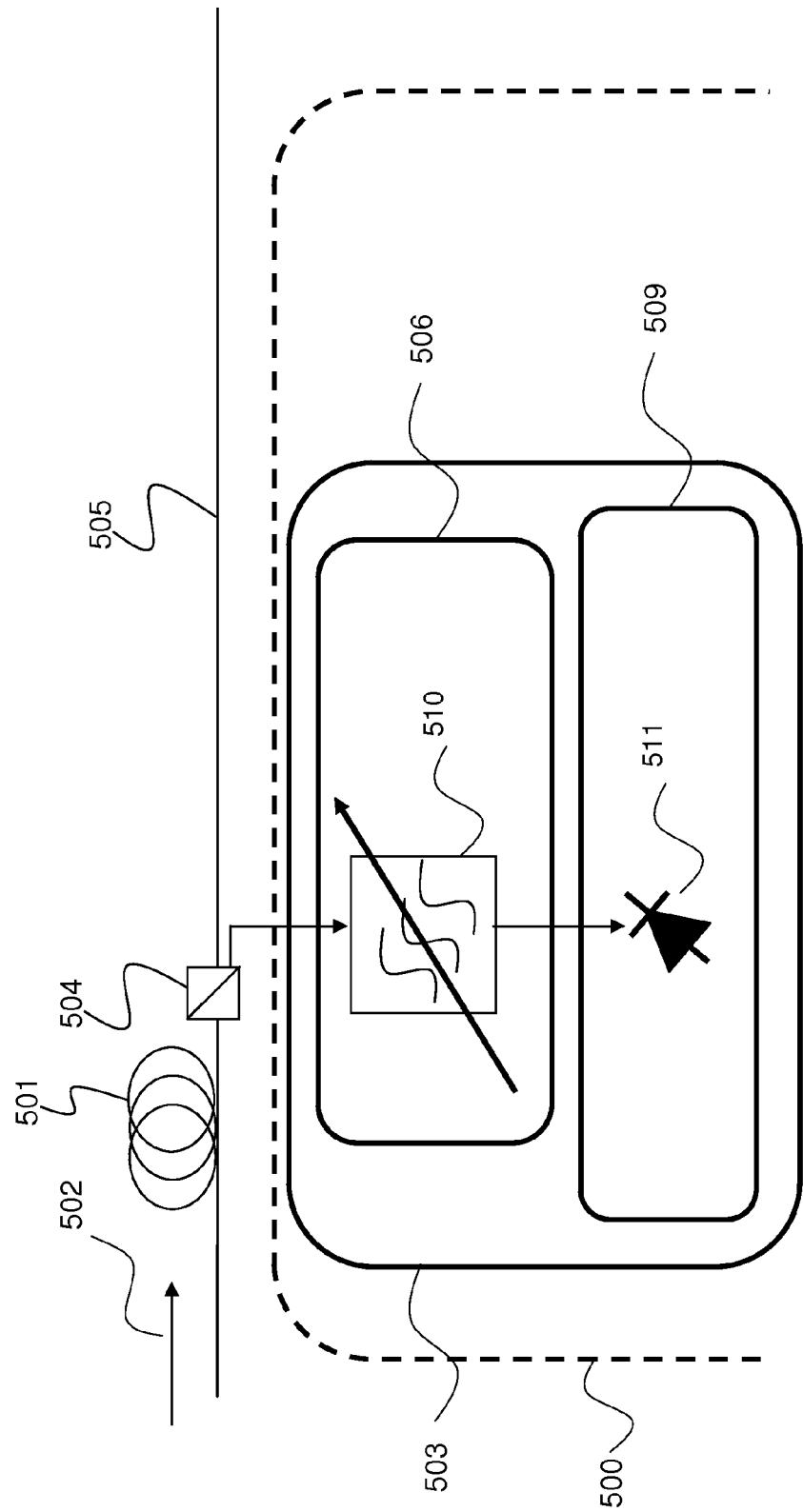
FIG. 5 is a partial schematic illustration of yet another OPM for use in the methods and apparatus according to the invention.

FIG. 5 is a partial schematic illustration of an example of another OPM 500 for use by the apparatus 240, an optical system, or an optical node 100 in the fibre optic communication link having optical fibre span 501. The fibre optic communication link carries an optical signal 502 including a plurality of optical channels. The OPM 500 includes a measuring unit 503 that comprises a channel selector 506 coupled to an optical input, which receives at least a proportion of the signal light from the optical signal 502 via signal tap 504 at the end 505 of the span 501. The channel selector 506 is arranged to receive the proportion of signal light from the optical input (which may comprise one or more port(s)) and select one or more channel(s) for measurement of optical properties. Channel selector 506 is coupled to optical measuring device 509 and provides the selected one or more channel(s) to optical measuring device 509 for measuring the optical power which can be provided as raw data or converted to a measure of the properties therein. Although this is not shown, the measuring unit 503 outputs data representative of the measurements of the optical properties related to the one or more selected channel(s) for use in optimising the performance of the optical communication link or optical system. The data may be sent to a node (not shown) for processing.

In this example, the channel selector 506 comprises a wavelength tuneable device 510, which may further comprise multiple tuneable filters (not shown) each receiving at least a portion of the tapped off light and configured to select the desired channel(s). Control of the port(s) and channel(s) that should be selected is dependent upon the monitored operating conditions of the node. The controller that controls the channel selector may be an integral processing element within the OPM 500 or within the node (not shown) that provides a programmed response to the data output from measuring unit 503, and/or other external inputs from other optical elements (eg. other OPMs) in the node or the node master controller. Alternatively, a controller external to the node may be used to manage the channel selector 506 provided the timing of the whole system supports the operational requirements.

In operation, a proportion of the optical signal 502 is received as signal light by the optical input port of OPM 500, where the tuneable filter 510 of channel selector 506 selects one or more desired optical channels of the signal light for measurement. The tuneable filter device 510 is coupled to the optical measuring device 509. In this embodiment, the optical measuring device 509 comprises a photosensitive device 511 such as a PIN diode. The tuneable filter(s) of the tuneable filter device 510 are tuneable to any of the signal wavelengths, which means only light of a selected channel or selected set of channels is passed for measurement by the photosensitive device 511 of optical measuring device 509. The electrical signal from by the photosensitive device 511, such as a PIN diode, would be converted into an optical properties measurement of, for example, optical channel power, optical signal to noise ratio (OSNR), total signal power, total optical power, optical noise, pump power, and/or backscatter power via an electronic circuit that may incorporate data processing electronics.

The tuneable filter(s) of the tuneable filter device 510 may be made from a diffraction grating whose angle relative to the photosensitive device 511 can be changed to pass different wavelengths of light to the photosensitive device 511. Alternatively or in addition to, the tuneable filter(s) of tuneable filter device 510 can be designed so that it does not need to sequentially move from wavelength to wavelength, but instead can be tuned to any wavelength in any order. This adds an increased granularity to the power measurement that is not achievable with the conventional TAP-PIN combination. The bandwidth of the tuneable filter(s) of tuneable filter device 510 can also be expanded so that more than one channel can pass into the photosensitive device 511 allowing sub-band measurements to be made. This could be achieved with a diffraction grating (not shown) and changing the distance or length of the optical path between the grating and the photosensitive device 511.

Although the wavelength tuneable device 510 comprises a tuneable filter or multiple tuneable filters, it is to be appreciated that the wavelength tuneable device 510 can be realised in many ways such as, but not limited to, tuned thin film filters (eg. angle or temperature), tuned grating (angle), and/or acousto-optic devices such as acousto-optic filters. Tuned thin film filters are wavelength (channel) tuneable by varying the angle of incident signal light or tuneable by varying the temperature. In acousto-optic filters the wavelength of the diffracted light is dependent on the acoustic frequency, by tuning the frequency of the acoustic wave, the desired wavelength (channel) of an optical signal can be diffracted acousto-optically.

Figure 6:
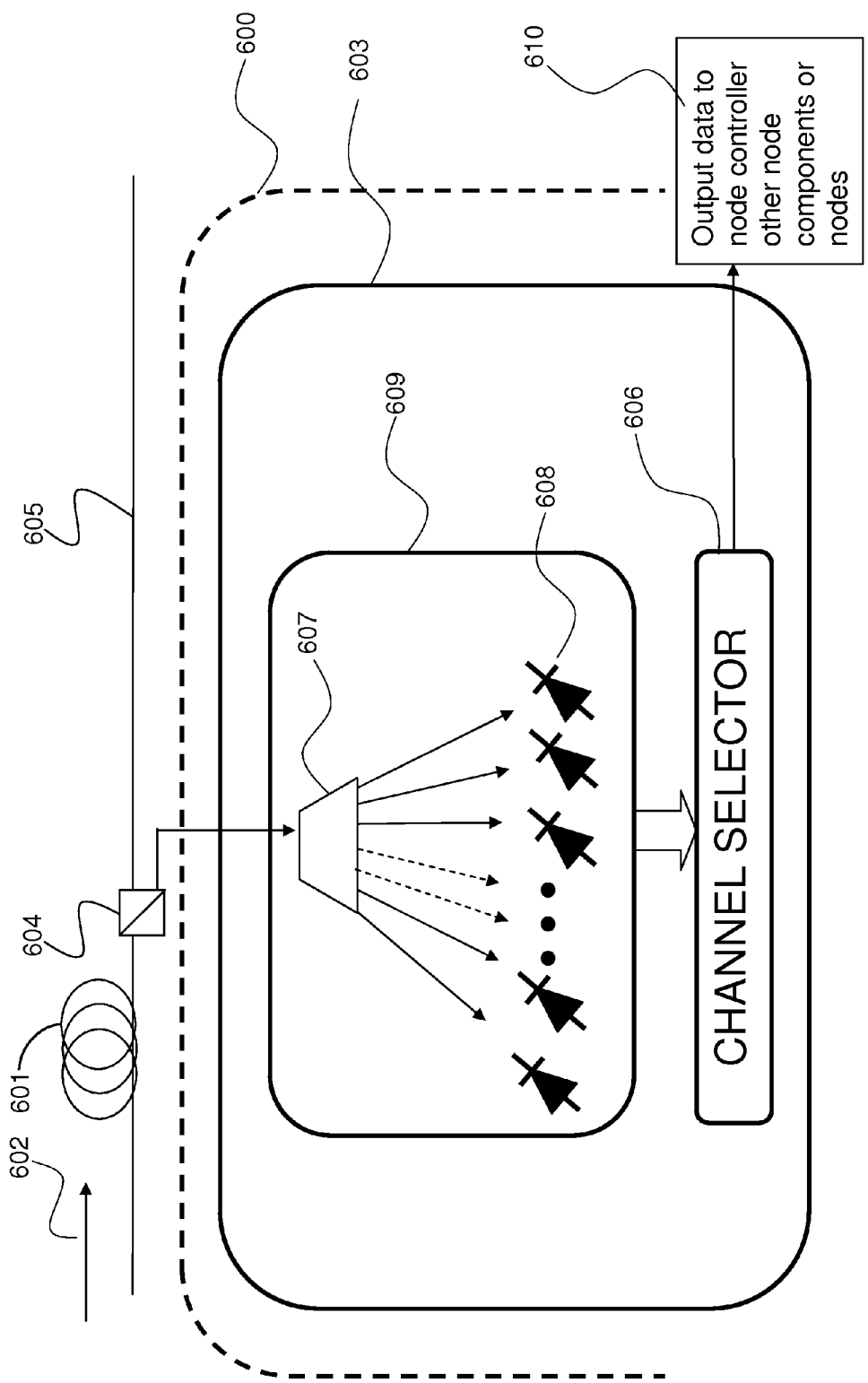
FIG. 6 is another partial schematic illustration of a further OPM for use in the methods and apparatus according to the invention.

FIG. 6 is another partial schematic illustration of another example of an OPM 600 for use by the apparatus 240, an optical system, or an optical node 100 in the fibre optic communication link having an optical fibre span 601. The fibre optic communication link carries an optical signal 602 including a plurality of optical channels. The OPM 600 includes a measuring unit 603 that comprises a optical measuring device 609 coupled to an optical input that receives at least a proportion of the signal light from the optical signal 602 via signal tap 604 at the end 605 of the span 601. The optical measuring device 609 comprises a channel demultiplexing device 607 arranged to receive the proportion of signal light from the optical input (which may comprise one or more optical input port(s)) and a set of photosensitive devices 608 (or an array of photosensitive devices) for measuring the optical light power and subsequently converted into a measure of the properties of a plurality of demultiplexed channels. Channel selector 606 selects a set of desired channel(s) that were measured and outputs 610 data representative of the measurements of the optical properties related to the selected set of desired channel(s) for use in optimising the performance of the optical communication link or optical system. The data may be sent or transmitted to a node (not shown) for processing.

In this example, the demultiplexing device 607 substantially directs each channel of the proportion of signal light to a corresponding photosensitive device in the set of photosensitive devices 608 (e.g. PIN diodes) and corresponding electronic circuit to convert the light power on the photosensitive devices 608 such as PIN diodes into a measure of the optical properties. The demultiplexing device 607 uses a fixed filtering technique such as an arrangement of a cascade of thin film filters or an arrayed waveguide grating. If the number of photosensitive devices in the set of photosensitive devices 608 equals the demultiplexed channels, then optical measuring device 609 can continuously measure all channels. This means that any set of channels can be selected. Channel selector 606 selects the optical property measurements from a desired set of channels. Control of the port(s) and channel(s) that should be selected is dependent upon the monitored operating conditions of the node. The controller that controls the channel selector 606 may be an integral processing element within the OPM 400 or within the node (not shown) that provides a programmed response to the data output from measuring unit 603, and/or other external inputs from other optical elements (e.g. other OPMs) in the node or the node master controller. Alternatively, a controller external to the node may be used to manage the measuring unit 603, optical measuring unit 609, and/or channel selector 606 provided the timing of the whole system supports the operational requirements.

Figure 7:
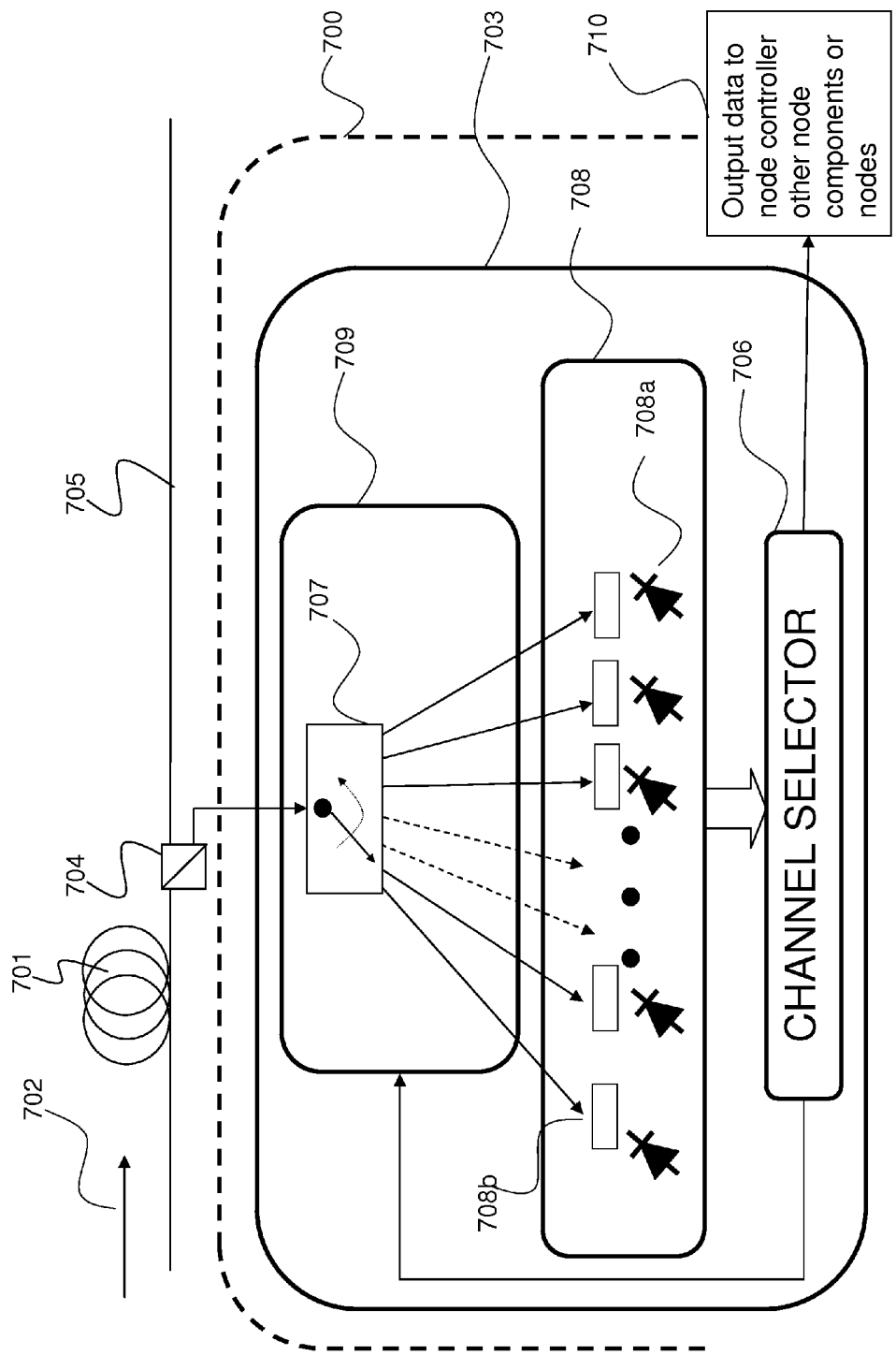
FIG. 7 is a further partial schematic illustration of another OPM for use in the methods and apparatus according to the invention.

FIG. 7 is a further partial schematic illustration of another example OPM 700 for use by the apparatus 240, an optical system, or an optical node 100 in a fibre optic communication link having an optical fibre span 701. The fibre optic communication link carries an optical signal 702 including a plurality of optical channels. The OPM 700 includes a measuring unit 703 that comprises an optical switching device 709 coupled to an optical input that receives at least a proportion of the signal light from the optical signal 702 via signal tap 704 at the end 705 of the span 701. The optical switching device 709 comprises an optical switch 707 arranged to receive the proportion of signal light from the optical input (which may comprise one or more optical input port(s)) and switch one or more of the plurality of channels for output to an optical measuring device 708. Optical measuring device 708 comprises a set of filters 708b to select a specific channel or band of channels and photosensitive devices 708a for measuring the optical properties of the one or more switched channels. In addition, and not shown, is an electronic circuit that is used to convert the light power on the set of photosensitive devices 708a (e.g. PIN diodes) into a measure of the optical properties. Channel selector 706 is coupled to the optical switching device 709 for selecting a set of desired channel(s) to be switched and measured. Channel selector 706 outputs 710 data representative of the measurements of the optical properties related to the selected set of desired channel(s) for use in optimising the performance of the optical communication link or optical system. The data may be sent or transmitted to a node (not shown) for processing.

In this example, the switching device 709 substantially directs a selected channel of the proportion of signal light to a corresponding photosensitive device in the set of photosensitive devices 708a. The switching device 709 may also include a fixed filtering technique such as an arrangement of a cascade of thin film filters or an arrayed waveguide grating instead of filter 708b, which would reduce the number of photosensitive devices required in the set of photosensitive devices 708a. Channel selector 706 selects the optical property measurements from the photosensitive devices in the set of photosensitive devices corresponding to the desired set of channels. Control of the port(s) and channel(s) that should be selected is dependent upon the monitored operating conditions of the node. The controller that controls the channel selector 706 may be an integral processing element within the OPM 700 or within the apparatus 240 or node 100 (not shown) that provides a programmed response to the data output from measuring unit 703, and/or other external inputs from other optical elements (eg. other OPMs) in the node 100 or the node master controller. Alternatively, apparatus 240 or a controller external to the node 100 may be used to manage the measuring unit 703, switching device 709, optical measuring unit 708, and/or channel selector 706 provided the timing of the whole system supports the operational requirements.

As an example, when an OPM as described herein for use by the methods or apparatus according to the present invention is used in amplifier nodes, the OPM enables the monitoring and control process to enable real-time optimisation of a Raman amplifier during channel reconfiguration/maintenance/transient events. Rapid stabilisation/optimisation of the channel powers in a node 100 due to adding or dropping channels is possible by changing the port order and/or channels to be read to increase the speed of data read in a single or multi-port OPM/OCM.

The embodiments and examples of the OPM including a controller or processor, may include memory for storing a computer program, comprising computer readable code which, when executed in the processor or OPM, causes the OPM to perform the steps of, receiving a proportion of signal light from an optical signal, selecting one or more desired optical channels of the signal light for measurement, measuring one or more desired optical properties of the selected optical channels, and outputting data representative of the desired optical properties of the desired channels.

It is to be appreciated that the optical node 100 may include one or more OPMs (e.g. OPMs 300 to 700) for use in measuring the optical properties of the set of optical channels of a measurement sequence. The OPM may include an optical input for receiving, from one or more monitoring points 111 to 115 within the optical node 100, a portion of the signal light from the set of optical channels. The optical node 100 may be configured using apparatus 240 to select a set of desired optical channels from the set of optical channels for measurement according to a measurement sequence. The OPM is then instructed to perform the steps of measuring an optical property of the selected set of desired optical channels, and outputting data representative of the optical properties of the selected set of desired channels for use by the optical node 100 or the apparatus 240 in analysing, monitoring, and/or controlling the optical node 100 or its optical components. The OPM can be configured based on a measurement sequence to measure the optical properties of the selected optical channels over a desired time-frame. The OPM may also be configured to decrease the desired time-frame to speed up measuring the desired channels due to channel configuration changes detected within the optical node, or to increase the desired time-frame to slow down measuring the desired channels when the channel configuration of the optical node is substantially stable. The OPM may also be configured, based on a measurement sequence, to change the order of measuring the one or more desired optical channels.

In addition, methods, apparatus, and OPMs as described with reference to FIGS. 1 to 7 for monitoring and controlling according to the invention may be implemented as a computer program or equivalent controller, comprising computer readable code or logic array code which, when executed in an processor or programmable logic array within an optical node 100 or within the optical system, causes the processor or logic to perform the steps of the methods and/or operations of the apparatus and OPMs as described herein.

For example, such steps may include determining one or more desired channels within the node or optical system for measuring the optical properties, instructing at least one OPM or other optical monitoring device to measure the optical properties of one or more desired channels, receiving data representative of the desired optical properties of the desired channels from the at least one OPM, and performing optical node optimisation based on the received data.

Such computer programs or logic code as described herein can be incorporated within one or more programmable products, each comprising a computer readable medium and one or more of the computer programs, where one or more of the computer programs are stored on the computer readable medium.

The methods 200 to 220 and apparatus 240 for monitoring and controlling a node 100 or optical system as described herein, the OPMs 300 to 700 as described in FIGS. 3 to 7 for use in monitoring and controlling as described herein, may be implemented using processor(s), processing logic or field programmable gate arrays comprising memory or logic gates for storing instructions, computer program(s), or logic which, when executed in the processor, processing logic, or logic gates, causes the methods for monitoring and controlling, apparatus 240 or OPM(s) to perform the method steps as outlined herein. The methods and apparatus for controlling and monitoring a node 100 or optical system according to the invention, methods for controlling an OPM according to the invention, or OPMs according to the invention may be provided in hardware modules or apparatus. These modules and apparatus may comprise, but are not limited to, one or more integrated circuits, one or more semiconductor device(s) or chips(s), complementary metal oxide semiconductor device(s) or chip(s), field programmable gate array(s), application-specific integrated circuit(s), photonic integrated device(s) or chip(s), integrated optical circuit(s) or chip(s), dedicated or shared processor(s), and/or other programmable logic devices, or any other appropriate integrated circuit(s), chip(s), apparatus or device(s) now known or later developed.

Although the invention has been described in terms of preferred examples or embodiments as set forth above, it should be understood that these examples or embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method for monitoring and controlling an optical node, the optical node comprising one or more optical components connected by optical fibre carrying an optical signal, the optical signal including a plurality of optical channels, the method comprising:

determining a set of measurement sequences, each measurement sequence defining a set of optical channels from the plurality of optical channels and a measuring sequence for measuring an optical property of the set of optical channels at a defined set of monitoring points along the optical signal path within the optical node;

selecting a measurement sequence from the set of measurement sequences, the selection based on the current operating conditions of the optical node;

measuring the optical properties of the set of optical channels of the selected measurement sequence at each monitoring point;

analyzing the measured optical properties for determining whether one or more optical components are causing the optical node to operate outside the tolerance of a defined set of operating conditions; and, if necessary adjusting the operation of the determined optical components to enable the optical node to operate in accordance with the defined set of operating conditions.

2. A method according to claim 1, wherein the step of determining further comprises:

detecting dynamic channel conditions within the optical node;

selecting a measurement sequence from the set of measurement sequences based on the location of the detected dynamic channel conditions within the optical node.

3. A method according to claim 1, wherein the step of determining further comprises:

detecting stable channel conditions within the optical node; and selecting a measurement sequence from the set of measurement sequences based on the detected stable channel conditions.

4. A method according to claim 1, wherein the optical node includes a multiple of optical ports for measuring the plurality of optical channels, and the step of determining the set of measurement sequences is based on at least one of the following parameters in the group of:

the plurality of optical channels;

a number of optical ports within the optical node to be read;

a measurement sequence for reading the optical ports;

a number of wavelengths to be read per optical port;

a measurement sequence of wavelengths within the optical port;

a measurement time interval;

a number of samples per measurement; and a number of expected operating conditions per measurement.

5. A method according to claim 1, wherein the step of analyzing further comprises the steps of:

calculating the optical parameters corresponding to the defined set of operating conditions for each optical property measured;

comparing the optical parameters within the corresponding optical property measured;

determining whether the comparison of the optical parameters with the corresponding optical property measured indicates changes in operating conditions of the optical components of the optical node; and identifying a set of optical components by including an optical component of the optical node within the set of optical components when the change in operating conditions for the included optical component is outside the tolerance of the defined operating conditions of the optical component.

6. A method according to claim 5, wherein the step of determining further comprises determining whether the comparison of the optical parameters within the corresponding optical property measured indicates a safety critical condition occurring within the optical node, and the step of adjusting further comprises sending a message to a controller indicating the safety critical condition for use by the controller in adjusting the corresponding optical component.

7. A method according to claim 5, wherein the step of determining further comprises determining whether the comparison of the optical parameters with the corresponding optical property measured indicates a safety critical condition occurring within the optical node, and the step of adjusting further comprises adjusting the corresponding optical component in relation to the safety critical condition.

8. A method according to claim 1, wherein the optical components comprise at least one optical component from the following group of:
an optical amplifier;
an optical performance monitor;
a Erbium doped amplifier;
a Raman amplifier;
a Raman pump module;
a wavelength selective switch;
an optical routing device;
a wavelength blocker;
a dispersion compensator;
a polarization mode dispersion compensator; and
add and/or drop routing devices.

9. A method according to claim 8, further comprising controlling the functionality and performance of at least one optical function from the group of optical components based on the measured set of optical properties.

10. A method according to claim 1, wherein the optical node comprises an optical performance monitor, OPM, for use in measuring the optical properties of the set of optical channels, the OPM comprising an optical input for receiving, from one or more monitoring points within the optical node, a portion of the signal light from the set of optical channels, the method further comprising:
selecting, based on the selected measurement sequence, a set of desired optical channels from the set of optical channels for measurement;
instructing the OPM to perform the steps of:
measuring an optical property of the selected set of desired optical channels, and
outputting data representative of the optical properties of the selected set of desired channels for use in the step of analysing.

11. A method according to claim 10, further comprising the step of configuring the OPM, based on the selected measurement sequence, to measure the optical properties of the selected optical channels over a desired time-frame, wherein the desired time-frame is decreased to speed up measuring the desired channels due to channel configuration changes detected within the optical node, and the desired time-frame is increased to slow down measuring the desired channels when the channel configuration of the optical node is substantially stable.

12. A method according to claim 1, wherein the optical properties measured comprise at least one optical property from the group comprising:
optical channel power;
optical signal to noise ratio (OSNR);
total signal power;
optical noise;
pump power; and
backscatter power.

13. An apparatus for controlling and monitoring a node comprising:
a control unit configured for:
determining a set of measurement sequences, each measurement sequence defining a set of optical channels from the plurality of optical channels and a measuring sequence for measuring an optical property of the set of optical channels at a defined set of monitoring points along the optical signal path within the optical node; and
selecting a measurement sequence from the set of measurement sequences, the selection based on the current operating conditions of the optical node;
a measuring unit configured for measuring the optical properties of the set of optical channels of the selected measurement sequence at each monitoring point;
an analysis unit configured for analysing the measured optical properties for determining whether one of more optical components are causing the optical node to operate outside the tolerance of a defined set of operating conditions; and
wherein the control unit is further configured for adjusting the operation of the determined optical components to enable the optical node to operate in accordance with the defined set of operating conditions.

14. An optical performance monitor for use in monitoring and controlling an optical node, the optical node comprising an optical fibre carrying an optical signal, the optical signal including a plurality of optical channels, the monitor comprising: an optical input for receiving at least a proportion of signal light from the optical signal; a measuring unit coupled to the optical node, the measuring unit operable to measure an optical property of a selected set of desired optical channels at a defined set of monitoring points disposed in sequence along the optical signal path between the input and the output of the optical node; and a transmitter for outputting data representative of the optical properties of the selected set of desired channels at each monitoring point; wherein the measuring unit comprises: a channel selector operable to select the set of desired optical channels on demand, wherein the channel selector comprises a wavelength tune able device coupled to the optical input, the tune able device operable to select the set of desired optical channels; and a photosensitive device for measuring the optical property of at least one of the desired optical channels.

15. An optical performance monitor according to claim 14, wherein the measuring unit comprises:
a demultiplexing device for demultiplexing the signal light into a plurality of optical channels; and
a set of photosensitive devices for receiving the demultiplexed signal, each photosensitive device arranged to measure the optical properly of at least one of the desired optical channels.

16. An optical performance monitor according to claim 14, further comprising:
a channel selector operable to select the set of desired optical channels on demand, wherein the channel selector further comprises a switching device for switching the signal over the set of desired optical channels; and
the measuring unit further comprises a set of photosensitive devices for receiving the switched signal, each photosensitive device for measuring at least one of the desired optical channels.

17. An optical performance monitor according to claim 14, wherein the measurement unit is configured to measure the optical properties of the selected optical channels at each defined monitoring point between the input and output of the optical node over a desired time-frame, and wherein the measurement unit is further configured to decrease the desired time-frame to speed up measuring the desired channels due to channel configuration changes within the optical signal, and to increase the desired time-frame to slow down measuring the desired channels when the channel configuration of the optical signal is substantially stable.

18. An optical performance monitor according to claim 14, wherein the optical properties measured comprise at least one optical property from the group comprising:
   optical channel power;
   optical signal to noise ratio (OSNR);
   total signal power;
   optical noise;
   pump power; and
   backscatter power.

* * * * *